US012695823B2

(12) United States Patent (10) Patent No.: US 12,695,823 B2

Kumar Agrawal et al. (45) Date of Patent: Jul. 28, 2026

(54) DEFORMABLE ELECTRONIC DEVICES AND CORRESPONDING METHODS FOR PRESENTING CONTENT ON A DISPLAY WHILE IN A TENT-FOLDED, SURFACE SUPPORTED GEOMETRIC CONFIGURATION

(71) Applicant: Motorola Mobility LLC, Chicago, IL (US)

(72) Inventors: Amit Kumar Agrawal, Bangalore (IN); Ganesh Pradeep P V, Bangalore (IN); Sinchana A P, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 225 days.

(21) Appl. No.: 18/772,241

(22) Filed: Jul. 14, 2024

(65) Prior Publication Data

US 2026/0019489 A1 Jan. 15, 2026

(51) Int. Cl.
*H04M 1/02* (2006.01)

(52) U.S. Cl.
CPC ....... *H04M 1/0268* (2013.01); *H04M 1/0264* (2013.01)

(58) Field of Classification Search
CPC .......................... H04M 1/0268; H04M 1/0264
See application file for complete search history.

(56) References Cited

U.S. PATENT DOCUMENTS

| | | | | |
|---|---|---|---|---|
| 11,715,327 | B2 | 8/2023 | Alameh et al. | |
| 2022/0221910 | A1* | 7/2022 | Lee | G06F 3/048 |
| 2023/0049857 | A1* | 2/2023 | Park | G06F 1/1616 |
| 2026/0059037 | A1* | 2/2026 | Jang | H04M 1/0214 |

OTHER PUBLICATIONS

"Nubia Watch", Flexible wristwatch; Unknown exact availability date but believed to be prior to filing of present application; Available online at https://www.nubiamart.com/nubia-watch.html?srsltid=AfmBOopV9m6natcLzCC8Q19r_8GSen9YwaVePoUZntvX44gQTAoCR-JA.

"The Most Futuristic Flexible Display Phone", YouTube; Unbox Therapy Channel; Nubia Alpha Watch; Premiered Mar. 29, 2029; available at https://www.youtube.com/watch?v=JbY8DM8c-h0&t=292s.

Kumar Agrawal, et al., "Methods and Electronic Devices for Moving Content Presented on a Display as a Function of Device Geometry and Support Condition", Application as Filed; U.S. Appl. No. 18/676,303, filed May 28, 2024.

Mertens, Ron , "Samsung Flexible-display watch design patent surface", Posted Aug. 4, 2013; Available online at https://www.oled-info.com/samsung-flexible-display-watch-design-patent-surface.

* cited by examiner

*Primary Examiner* — Curtis A Kuntz

(74) *Attorney, Agent, or Firm* — Philip H. Burrus, IV

(57) ABSTRACT

An electronic device includes a deformable housing supporting a flexible display and an image capture device. The device features one or more sensors to determine a tent-folded, surface supported geometric configuration, dividing the flexible display into distinct portions. Additionally, one or more other sensors are operable to receive audible control commands. One or more processors, responsive to these commands, enable the image capture device to capture images. Depending on whether the captured image meets predefined criteria, the processors control the presentation of content on specific portions of the flexible display. The device can present content on a first portion when an image depicts a face, or on a second portion when no face is depicted.

20 Claims, 8 Drawing Sheets

DEFORMABLE ELECTRONIC DEVICES AND CORRESPONDING METHODS FOR PRESENTING CONTENT ON A DISPLAY WHILE IN A TENT-FOLDED, SURFACE SUPPORTED GEOMETRIC CONFIGURATION

BACKGROUND

Technical Field

This disclosure relates generally to electronic devices, and more particularly to deformable electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in geometric configuration, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. It would be advantageous to have an improved electronic device can operate in both deformed and non-deformed states, as well as corresponding methods for presenting content when in the deformed states.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
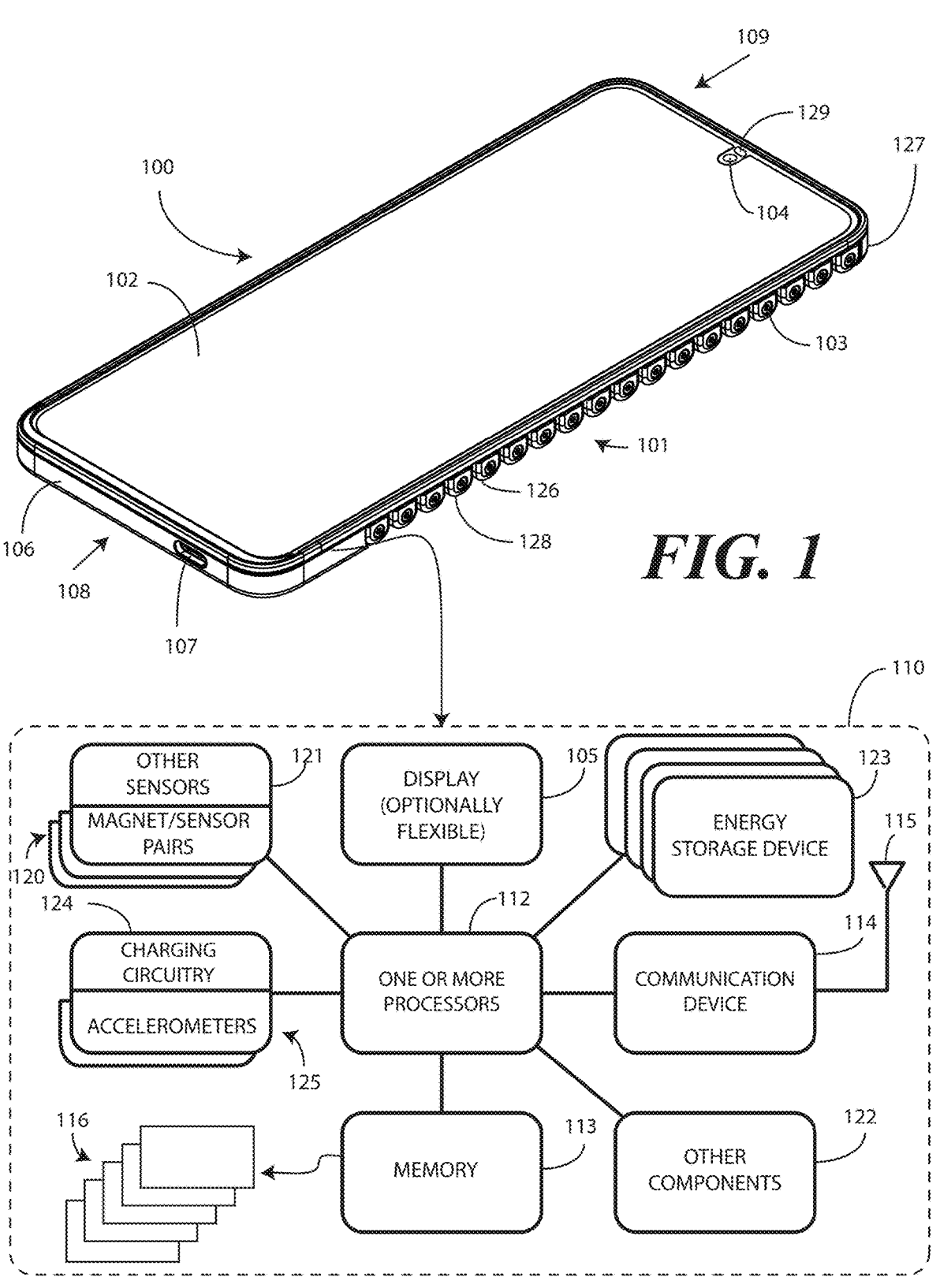
FIG. 1 illustrates one explanatory deformable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, when one or more sensors determine a tent-folded, surface supported geometric configuration delineating the flexible display of the electronic device into a first portion situated to a first side of a tent fold defined by the tent-folded, surface supported geometric configuration, a second portion situated to a second side of the tent fold, and a deformed portion occurring at the tent fold, and one or more other sensors receive an audible control command, using one or more processors to cause a presentation of content to occur on a first portion of the flexible display when one or more images captured by an image capture device match a predefined criterion and cause the content to be presented on a second portion of the flexible display when the one or more images match a second predefined criterion. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, in response to an electronic device being in a tent geometric configuration when an audible command requesting the presentation of content is received, capturing at least one image with an image capture device and causing the presentation of the content to occur on a first portion of the flexible display situated to a first side of the tent fold when the at least one image depicts a face, as described herein. The non-processor circuits may include, but are not limited to, a radio receiver, a radio transmitter, signal drivers, clock circuits, power source circuits, and user input devices. As such, these functions may be interpreted as steps of a method to perform a method of causing a content presentation on a first portion of the flexible display situated on a first side of a tent-fold geometric configuration when the one or more images depict a person and to cause the content presentation on a second portion of the flexible display situated to a second side of the tent-fold geometric configuration when the one or more images fail to depict any person.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure address a significant challenge faced by adaptive display devices when placed in a tent geometric configuration. In this configuration, the device is typically positioned on a table or desk, forming a tent-like structure. The primary issue arises from the need to render visual content on the appropriate side of the display based on the user's position. In prior art systems, the content is rendered on only one side of the tent portion where the camera is located. This setup requires the user to manually rotate the device if they are seated on the opposite side, which is inconvenient and disrupts the user experience.

Moreover, a potential workaround of rendering visual content on both sides of the display simultaneously is not feasible due to severe battery constraints. Most adaptive display devices, being extremely thin and flexible, have limited battery capacity. Displaying content on both sides would significantly drain the battery, making it impractical for prolonged use. This limitation is particularly critical given the device's form factor and the need for efficient power management.

Thus, embodiments of the disclosure contemplate there is a pressing need for a solution that allows the device to dynamically render visual content on the active viewing portion of the display based on the user's presence and position. The goal is to enhance the user experience by ensuring that the content is always visible to the user without requiring manual adjustments or compromising battery life. Advantageously, embodiments of the disclosure aim to address these challenges by leveraging the device's camera and voice interaction capabilities to intelligently determine the user's position and render content accordingly.

In one or more embodiments, an electronic device comprises a deformable housing supporting a flexible display and an image capture device. In one or more embodiments, the electronic device comprises one or more sensors operable to determine a tent-folded, surface supported geometric configuration of the electronic device delineating the flexible display into a first portion situated to a first side of a tent fold defined by the tent-folded, surface supported geometric configuration, a second portion situated to a second side of the tent fold, and a deformed portion occurring at the tent fold.

In one or more embodiments, the electronic device comprises one or more other sensors operable to receive an audible control command and one or more processors. In one or more embodiments, the one or more processors cause, in response to the audible control command, the image capture device to capture at least one image. In one or more embodiments, when the at least one image matches a first predefined criterion, the one or more processors cause a presentation of content to occur on the first portion of the flexible display. In one or more embodiments, when the at least one image matches a second predefined criterion, the one or more processors cause the presentation of the content to occur on the second portion of the flexible display.

Advantageously, in one or more embodiments the deformable housing supporting a flexible display and an image capture device allows the electronic device to adapt to various geometric configurations, such as a tent-folded configuration, enhancing its versatility and usability in different scenarios. By utilizing one or more sensors to determine the tent-folded, surface-supported geometric configuration, the device can accurately delineate the flexible display into distinct portions. This ensures that the display content is appropriately divided and presented based on the device's physical state, improving the user experience by providing a clear and organized display layout.

The inclusion of one or more other sensors operable to receive audible control commands enables hands-free interaction with the device. This feature is particularly useful in tent mode, where manual adjustments might be inconvenient. The ability to control the device through voice commands enhances accessibility and ease of use.

In one or more embodiments, the one or more processors, in response to the audible control command, cause the image capture device to capture at least one image. This integration of voice and visual input allows the device to intelligently determine the user's position and adjust the display content accordingly. This dynamic adjustment ensures that the content is always visible to the user without requiring manual rotation of the device, thereby enhancing convenience and user satisfaction.

In one or more embodiments, when the captured image matches a first predefined criterion, such as depicting a face, the processors cause the presentation of content to occur on the first portion of the flexible display. Conversely, when the image matches a second predefined criterion, such as failing to depict a face, the content is presented on the second portion of the display. This intelligent content management optimizes battery usage by only activating the necessary portion of the display, addressing the battery constraints associated with thin, flexible devices.

In one or more embodiments, a method in a deformable electronic device comprises detecting, with one or more sensors, a deformable housing of the electronic device being deformed into a tent geometric configuration with an apex defined by a tent fold of the tent geometric configuration being situated above a base defined by ends of the deformable housing. In one or more embodiments, the method comprises receiving, with an audio input device, an audible command requesting a presentation of content on a flexible display supported by the deformable housing.

In one or more embodiments, the method comprises capturing, with an image capture device situated to a first side of the tent fold, at least one image. In one or more embodiments, the method comprises causing, by one or more processors, the presentation of the content to occur on a first portion of the flexible display situated to the first side of the tent fold when the at least one image depicts a face. In one or more embodiments, the method comprises further comprising causing, by the one or more processors, the presentation of the content to occur on a second portion of the flexible display situated to a second side of the tent fold when the at least one image fails to depict any face.

As noted above, electronic devices with flexible displays offer a variety of form factors to accommodate different user scenarios. One such form factor is the tent mode, where the device is propped up on a surface, resembling a tent. This mode is particularly useful for hands-free viewing and interaction, serving single or multiple users in various contexts such as gaming or voice-activated applications. However, as noted above, the tent mode presents a challenge in terms of content visibility and battery efficiency.

Current adaptive display devices in tent mode often render visual content on a fixed portion of the display, which may not align with the user's position. This necessitates manual adjustment of the device to ensure content visibility, disrupting the user experience. Additionally, some devices attempt to resolve this issue by mirroring content on both sides of the display. While this approach guarantees visibility, mirroring content on both sides of the display leads to rapid battery depletion, which is a significant concern for devices designed to be thin and portable with limited battery capacity.

Advantageously, embodiments of the present disclosure introduce a method for rendering visual content on the active viewing portion of an adaptive display device in tent mode. This method dynamically adjusts the display area to present content on the side of the device facing the user. The adjustment is based on user presence, optionally detected through an image capture device, and is triggered by an audible control command. This approach ensures that content is visible to the user without the need for manual repositioning of the device, and the method conserves battery life by activating only the necessary portion of the display.

In one or more embodiments, an electronic device comprises a deformable housing having a plurality of linkage members and a flexible display supported by the deformable housing. In one or more embodiments, the electronic device comprises one or more sensors operable to determine a tent-fold geometric configuration of the electronic device and one or more other sensors operable to receive an audible command requesting presentation of content on a portion of flexible display while in the tent-fold geometric configuration.

In one or more embodiments, the electronic device comprises an image capture device operable to capture one or more images in response to receipt of the audible command by the one or more other sensors and one or more processors operable with the one or more sensors and the one or more other sensors. In one or more embodiments, the one or more processors are operable to cause a content presentation on a first portion of the flexible display situated on a first side of the tent-fold geometric configuration when the one or more images depict a person and to cause the content presentation on a second portion of the flexible display situated to a second side of the tent-fold geometric configuration when the one or more images fail to depict any person.

Alternate embodiments are provided as well. Illustrating by example, in one or more embodiments the deformable housing may consist of a series of interconnected linkage members made from a lightweight, durable polymer that allows for smooth transitioning between various geometric configurations, including the tent-fold configuration. The flexible display supported by this housing could be an organic light emitting diode panel known for its flexibility and vibrant color reproduction, making it suitable for both indoor and outdoor use. The sensors responsible for determining the tent-fold configuration might include accelerometers and gyroscopes that accurately detect the orientation and shape of the device.

Another embodiment might feature a deformable housing constructed from a metal alloy, providing a sturdy frame that maintains its shape once configured into the tent-fold position. The flexible display in this case could be an e-ink display, optimized for prolonged battery life and readability in direct sunlight, making it ideal for e-readers or outdoor signage. The sensors in this embodiment could utilize a combination of magnetic sensors and hall effect sensors to detect the device's configuration, ensuring precise content presentation based on the device's form.

A further embodiment could incorporate a modular deformable housing, where linkage members are designed to be detachable and reconfigurable, allowing users to customize the size and shape of the device to their specific needs. The flexible display in this variant could be a cutting-edge micro-light emitting diode panel, offering high brightness and contrast ratios, suitable for high-end consumer electronics. The sensors for detecting the tent-fold configuration could employ a network of capacitive touch sensors embedded within the housing, providing real-time data on the device's physical state.

In yet another embodiment, the deformable housing could be designed with an integrated kickstand mechanism, enabling the device to be easily set up in the tent-fold configuration without additional support. The flexible display for this design might be a hybrid display that combines the benefits of both liquid crystal display and organic light emitting diode technologies, offering a balance between image quality and power consumption. The sensors used to determine the tent-fold configuration could be optical sensors that not only detect the device's shape but also the ambient light conditions, adjusting the display settings for optimal viewing.

Each of these embodiments can include an image capture device, such as a camera, positioned to effectively capture images when the device is in the tent-fold configuration. The camera could be equipped with advanced features like facial recognition or depth sensing to accurately determine whether a person is present and facing the display. The one or more processors within the device would be capable of running sophisticated algorithms to analyze the captured images and control the content presentation on the flexible display, ensuring that the content is visible to the user and that the inactive portion of the display is powered down to conserve battery life.

Advantageously, embodiments of the disclosure offer methods of dynamically rendering visual content on the active viewing portion of an adaptive display device in tent mode based on user presence and position. Unlike existing solutions that either require manual adjustment of the device or mirror content on both sides, embodiments of the disclosure leverage the device's camera and voice interaction capabilities to intelligently determine the user's position and render content accordingly. This approach not only enhances user convenience by eliminating the need for manual adjustments but also optimizes battery usage by activating only the necessary portion of the display. The integration of voice commands and image capture to manage content presentation in a tent-folded, surface-supported geometric configuration is a unique and innovative solution to the challenges posed by adaptive display devices. Other advantages offered by embodiments of the disclosure will be described below. Still others will be obvious to those of ordinary skill in the art having the benefit of this disclosure.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 comprising a plurality of linkage members.

In one or more embodiments, each linkage member includes a corresponding pivot member 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an undeformed configuration in which the deformable electronic device 100 is generally flat and substantially planar in FIG. 1. In such a configuration, the deformable electronic device 100 can function as a smartphone, palmtop computer, or tablet computer. However, as will be shown below with reference to FIG. 3, in another embodiment the deformable electronic device 100 can be folded into a tent geometric configuration, which can be referred to as a tent-folded, surface supported geometric configuration when the wider portion of the tent geometric configuration is supported by a surface, in a pad orientation, and can accordingly function as a table clock, content viewer, or auxiliary display when such a condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

In one or more embodiments, an OLED is constructed on flexible plastic substrates can allow the display 102 to become a flexible display 105 in one or more embodiments with various bending radii. For example, some embodiments allow bending radii of between thirty and six hundred millimeters to provide a bendable display. Other substrates allow bending radii of around five millimeters to provide a display that is foldable through active bending. Other flexible displays 105 can be configured to accommodate both bends and folds. In one or more embodiments the flexible display 105 may be formed from multiple layers of flexible material such as flexible sheets of polymer or other materials.

The explanatory deformable electronic device 100 of FIG. 1 also includes a deformable link assembly 101 comprised of a plurality of linkage members. In one or more embodiments, each linkage member includes one or more pivot members 103. Explanatory operation of one or more embodiments of the deformable link assembly 101 is described in commonly assigned U.S. patent application Ser. No. 18/213,679, filed Jun. 23, 2023, entitled "Deformable Electronic Devices and Methods for Constructing the Same," which is incorporated by reference herein for all purposes.

The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

In one or more embodiments, a flexible substrate is situated beneath the display 102. In one or more embodiments, the flexible substrate provides intermediary support structure between the display 102 and the deformable link assembly 101.

In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103 of each linkage member. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 129. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the deformable electronic device 100 optionally includes one or more magnet magnetometer pairs 120, operable with the one or more processors 112, to detect a bending operation that causes the deformable link assembly 101 to deform, thereby transforming the deformable electronic device 100 into a deformed geometry, such as that shown in FIGS. 2-7. In one or more embodiments, each magnet magnetometer pair 120 is situated in a linkage member of the plurality of linkage members defining the deformable link assembly 101 such that the magnetometer of each magnet magnetometer pair 120 is situated in a linkage member of the plurality of linkage members and at least one corresponding magnet is situated in another linkage member of the plurality of linkage members that is adjacent to the linkage member in which the magnetometer is situated.

Illustrating by example, if a magnet of one magnet magnetometer pair 120 is situated in linkage member 126, at least one corresponding magnet may be situated in linkage member 128, which is adjacent to linkage member 126. This adjacent positioning of the magnetometer and corresponding magnet of each magnet magnetometer pair 120 allows the one or more processors 112 to identify a deformed geometric configuration of the deformable electronic device 100 from signals received from the magnetometers of the magnet magnetometer pairs 120.

In the illustrative embodiment of FIG. 1, the magnet magnetometer pairs 120 comprise at least three magnet magnetometer pairs. Moreover, in one or more embodiments each magnet magnetometer pair is separated from each other magnet magnetometer pair by at least one linkage member of the plurality of linkage members defining the deformable link assembly 101.

However, more magnet magnetometer pairs 120 can be added as well. For instance, in other embodiments, every linkage member of the deformable link assembly 101 can include either a magnet or a magnetometer of a magnet magnetometer pair 120. Thus, it should be understood that embodiments of the disclosure can have as few as one magnet magnetometer pair 120 or as many as the number of linkage members.

In the illustrative embodiment of FIG. 1, the plurality of linkage members defining the deformable link assembly 101 comprises at least fifteen linkage members. Like the number of magnet magnetometer pairs 120, this number can vary as well. Increasing the number of linkage members allows for tighter bending radii, while decreasing the number of linkage members simplifies the design and reduces the part count necessary to construct the deformable electronic device 100.

In one or more embodiments at least some of the linkage members of the plurality of linkage members defining the deformable link assembly 101 house one or more rechargeable electrochemical cells. In the illustrative embodiment of FIG. 1, each linkage member of the plurality of linkage members defining the deformable link assembly 101 houses a rechargeable electrochemical cell pair.

In one or more embodiments, the magnetometer of odd instances of the linkage members housing the rechargeable electrochemical cell pairs is situated between a first pair of rechargeable electrochemical cells situated within the odd instances of the linkage members housing the rechargeable electrochemical cell pairs. The corresponding magnets of the magnet magnetometer pair 120 of even instances of the linkage members housing the rechargeable electrochemical cell pairs is then situated between a second pair of rechargeable electrochemical cells situated within the even instances of the linkage members housing the rechargeable electrochemical cell pairs.

This "between the cells" positioning of the magnet or magnetometer of each magnet magnetometer pair 120 allows for the determination of a wide range of deformable geometric configurations while using only a small number of magnet magnetometer pairs 120. However, in other embodiments, either the magnetometers or magnets can be situated outside the rechargeable electrochemical cell pairs as well. Other configurations will be obvious to those of ordinary skill in the art having the benefit of this disclosure.

Accelerometers 125 can be used in conjunction with the magnet magnetometer pairs 120. Illustrating by example, a first accelerometer can be positioned in the electronic circuit component housing 106, while a second accelerometer is situated within another electronic circuit component housing 127. In this illustrative embodiment, the electronic circuit component housing 106 is situated to one side of the plurality of linkage members defining the deformable link assembly 101, while the other electronic circuit component housing 127 is situated to another side of the plurality of linkage members defining the deformable link assembly 101.

In one or more embodiments, the one or more processors 112 can use the magnet magnetometer pairs 120 to detect a deformed or undeformed state of the deformable electronic device 100 and can then use the accelerometers 125 to distinguish orientations of those geometric configurations. Illustrating by example, in one or more embodiments the one or more processors 112 are configured to distinguish between the L pad geometric configuration and the L stand geometric configuration, or alternatively between the tent pad geometric configuration and the tent lean back geometric configuration, using signals received from the first accelerometer and the second accelerometer. Techniques for doing this will be described below with reference to FIG. 18. Others will be obvious to those of ordinary skill in the art having the benefit of this disclosure.

In one embodiment, the one or more processors 112 may generate commands or execute control operations based on information received from the various sensors, including the one or more magnet magnetometer pairs 120, the accelerometers 125, the user interface, or the other sensors 121. The one or more processors 112 may also generate commands or execute control operations based upon information received from a combination of the one or more magnet magnetometer pairs 120, the accelerometers 125, the user interface, or the other sensors 121. Alternatively, the one or more processors 112 can generate commands or execute control operations based upon information received from the one or more magnet magnetometer pairs 120 and the accelerometers 125 alone. Moreover, the one or more processors 112 may process the received information alone or in combination with other data, such as the information stored in the memory 113.

In one or more embodiments, the one or more processors 112 are also operable to actuate the image capture device 104 under certain conditions. Illustrating by example, in one or more embodiments the one or more processors 112 can execute a method that actuates the image capture device 104 in the electronic device 100 that causes the image capture device 104 to capture visual content such as images and videos.

In one or more embodiments, the image capture device 104 comprises of one or more cameras with various recording modes, including a video recording mode. In one or more embodiments, the one or more processors 112 control the image capture device 104, thereby instructing it to enter or exit the video recording mode based on specific detected conditions. This actuation capability can, for example, allow the electronic device 100 to function like a camcorder when it is wrapped around a user's wrist in a specific geometric form factor, and optionally lifted into a camcorder support condition.

In one or more embodiments, one or more sensors 121 are embedded within the electronic device 100 and are configured to detect a variety of conditions and inputs. These sensors may include, but are not limited to, accelerometers, gyroscopes, magnetometers, proximity sensors, and flex sensors, which can include the magnet magnetometer pairs 120.

In one or more embodiments, the one or more sensors 121 comprise an audio input/processor. The audio input/processor can receive audio input from an environment about the electronic device 100. The audio input/processor can include hardware, executable code, and speech monitor executable code in one embodiment.

The audio input/processor can be operable with one or more predefined authentication references stored in memory 113. The predefined authentication references can comprise representations of basic speech models, representations of trained speech models, or other representations of predefined audio sequences that are used by the audio input/processor to receive and identify voice commands that are received with audio input captured by an audio capture device. In one embodiment, the audio input/processor can include a voice recognition engine. Regardless of the specific implementation utilized in the various embodiments, the audio input/processor can access various speech models stored with the predefined authentication references to identify speech commands. The audio input/processor can also include one or more audio input devices, such as one or more microphones. In one or more embodiments, the audio/input processor is configured to receive and identify an audible control command from a user of the electronic device 100.

In one or more embodiments, the one or more sensors 121 can be capable of detecting a tent-folded, surface supported geometric configuration that occurs when the electronic device 100 is deformed int a tent fold with a first portion of the display 102 situated to a first side of the tent fold, a second portion situated to a second side of the tent fold, and a deformed portion occurring at the tent fold, with the base of the tent fold supported by a surface such as a table or desk. (An example of a tent-folded, surface supported geometric configuration is shown below in FIGS. 8-9.) In one or more embodiments. The one or more sensors 121 also comprise other sensors to receive an audible control command via a microphone.

In one or more embodiments, the one or more processors 112 are configured to cause, in response to the one or more other sensors receiving the audible control command, the image capture device 104 to capture at least one image. In one or more embodiments, when the at least one image matches a first predefined criterion, the one or more processors 112 cause a presentation of content to occur on the first portion of the display 102. By contrast, when the at least one image matches a second predefined criterion, the one or more processors 112 cause the presentation of the content to occur on the second portion of the display 102.

The one or more processors 112, which can serve as the central processing unit(s) of the electronic device 100, execute instructions and coordinating the operations of various components, examples of which can be stored as modules 116 within the memory 113. The one or more processors 112 are operable with the one or more sensors 121 to process the detected conditions, such as the tent-folded, surface supported geometric configuration.

Upon detecting these conditions in combination with receipt of an audible control command requesting the presentation of content, in one or more embodiments the one or more processors 112 are configured to use the one or more sensors 121 to determine to which side of the tent-folded, surface supported geometric configuration a user is situated and to present the content on that side of the tent fold of the tent-folded, surface supported geometric configuration. For example, the flexible display 105, as depicted in FIG. 1, is a component of the electronic device. The flexible display 105 is supported by the deformable housing and is capable of presenting visual content across the surface of the flexible display 105.

In one or more embodiments, the flexible display 105 is constructed on flexible plastic substrates, which allow for various bending radii, accommodating both bends and folds. This flexibility allows the electronic device to transform into different geometric configurations, such as the tent-folded, surface supported geometric configuration. The flexible display 105 may be formed from multiple layers of flexible material, such as sheets of polymer, to achieve the desired flexibility and durability.

One or more sensors 121 are embedded within the electronic device 100 and are configured to detect a variety of conditions and inputs. These sensors 121 include, but are not limited to, accelerometers, gyroscopes, magnetometers, proximity sensors, and flex sensors, which can include magnet magnetometer pairs 120. The one or more sensors 121 are capable of detecting a tent-folded, surface supported geometric configuration that delineates the flexible display

105 into a first portion situated to a first side of the tent fold, a second portion situated to a second side of the tent fold, and a deformed portion occurring at the tent fold. The one or more sensors 121 also comprise other sensors, such as the audio input/processor described above, to receive an audible control command via a microphone. In one or more embodiments, the one or more sensors 121 are operable to receive an audible control command, which triggers the image capture device 104 to capture at least one image.

One or more processors 112 are included within the electronic device 100 and are responsible for executing various operations in response to inputs from the one or more sensors 121. In one or more embodiments, the one or more processors 112 are configured to cause, in response to the audible control command, the image capture device 104 to capture at least one image.

In one or more embodiments, when the at least one image matches a first predefined criterion, the one or more processors 112 cause a presentation of content to occur on the first portion of the flexible display 105. Conversely, when the at least one image matches a second predefined criterion, the one or more processors 112 cause the presentation of the content to occur on the second portion of the flexible display 105. The one or more processors 112 can also be responsible for deactivating either the first or the second portion of the flexible display 105 depending on which side the user is detected to be present.

Using the configuration of the electronic device 100 of FIG. 1, when deformed to the tent-folded, surface supported geometric configuration the image capture device 104, as shown in FIG. 1, will be situated to a first side of the tent fold. Said differently, with the electronic device 100 of FIG. 1 the image capture device 104 and the first portion of the flexible display 105 are both situated to the first side of the tent fold defined by the tent-folded, surface supported geometric configuration.

In one or more embodiments, the image capture device 104 is configured to capture one or more images in response to the receipt of the audible command by the one or more sensors 121. The image capture device 104 or the one or more processors 112 the determine the presence of a user and their position relative to the electronic device 100.

When the at least one image captured by the image capture device 104 matches the first predefined criterion, such as depicting a face, the one or more processors 112 cause a presentation of content to occur on the first portion of the flexible display 105. If the at least one image matches the second predefined criterion, such as failing to depict a face or depicting one or more of a hand, a finger, or an inanimate object, the one or more processors 112 cause the presentation of the content to occur on the second portion of the flexible display 105. In some embodiments, the image capture device 104 is also configured to only capture images when the tent-fold geometric configuration is supported by a surface, such as a table or desk, which is oriented orthogonally relative to a direction of gravity.

Advantageously, by incorporating a deformable housing with a plurality of linkage members, the electronic device 100 can be configured into a tent-fold geometric configuration, which allows the electronic device 100 to be positioned stably on a surface such as a table or desk. This geometric configuration enhances the versatility of the electronic device 100, enabling it to be used in various scenarios such as hands-free viewing or interaction.

The flexible display 105 supported by the deformable housing ensures that the visual content can be presented on different portions of the display based on the user's position.

This adaptability improves the user experience by ensuring that the content is always visible to the user without requiring manual adjustments of the device.

The inclusion of one or more sensors 121 to determine the tent-fold geometric configuration allows the electronic device 100 to accurately detect its physical state and adjust the display 102 content accordingly. This ensures that the display 102 is appropriately divided and presented based on the device's form, providing a clear and organized layout for the user.

The use of one or more other sensors to receive audible commands enables hands-free interaction with the electronic device 100, which is particularly useful in tent mode where manual adjustments might be inconvenient. This feature enhances accessibility and ease of use, allowing the user to control the electronic device 100 through voice commands.

The image capture device 104, operable to capture images in response to audible commands, allows the electronic device 100 to intelligently determine the user's position. This dynamic adjustment ensures that the content is always visible to the user without requiring manual rotation of the electronic device 100, thereby enhancing convenience and user satisfaction.

The one or more processors 112, operable with the sensors 121 and the image capture device 104, ensure that the content presentation is optimized based on position of a user. This intelligent content management not only enhances the user experience but also optimizes battery usage by activating only the necessary portion of the display 102, addressing the battery constraints associated with thin, flexible devices.

In one or more embodiments, the one or more processors 112 can use an image capture device 104 to detect a gaze cone of a user of the electronic device 100. Gaze cone detection is an alternative way to determine the position of the user relative to the electronic device 100 in three-dimensional space.

The image capture device 104 is a component of the electronic device 100 that is responsible for capturing visual content, such as photos and videos. The image capture device 104 is operable with the one or more processors 112, which serve as the central processing unit(s) for the electronic device 100. These one or more processors 112 are responsible for executing instructions, processing data, and controlling the operation of the electronic device 100. The one or more processors 112 are operable with one or more sensors to cause a content presentation on the flexible display to move along the flexible display 105 as a function of changes in the position of a user relative to the electronic device 100 in three-dimensional space.

The one or more sensors 121 may further include a microphone, an earpiece speaker, a second loudspeaker, and a user interface component such as a button or touch-sensitive surface. The one or more sensors 121 may include one or more of an accelerometer, gyroscope, image capture device, and/or display touch sensors to determine whether the deformable electronic device 100 is being held or supported by a surface.

The one or more sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The other sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion. When the these motion sensors detect the electronic device 100 being still with a direction of gravity intersecting the tent fold of the tent-folded, surface supported geometric configuration, this can indicate that the tent-folded, surface supported geometric configuration is occurring.

Other components 122 operable with the one or more processors 112 can include output components such as video outputs, audio outputs, and/or mechanical outputs. Examples of output components include audio outputs such as speaker port 129, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, each energy storage device of the plurality of energy storage devices 123 comprises a rechargeable electrochemical cell. In one or more embodiments, the plurality of energy storage devices 123 include a pair of energy storage devices situated in each linkage member of the plurality of linkage members defining the deformable link assembly 101.

In one or more embodiments, each pair of energy storage devices of the plurality of energy storage devices 123 situates in a corresponding linkage member on a one-to-one basis, with a pair of energy storge devices 123 situated within a corresponding linkage member. In other embodiments, a single energy storage device of the plurality of energy storage devices 123 situates in a corresponding linkage member on a one-to-one basis. In still other embodiments, only some of the linkage members of the plurality of linkage members defining the deformable link assembly 101 will house energy storage devices. Other configurations will be obvious to those of ordinary skill in the art having the benefit of this disclosure.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device.

Each energy storage device of the plurality of energy storage devices 123 can take a variety of forms. In an illustrative embodiment, each energy storage device of the plurality of energy storage devices 123 can comprise an electrochemical cell, which is optionally rechargeable. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first linkage member, with a second pair of energy storages device situated in a second linkage member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch that is electrically coupled between the conductor coupling the plurality of energy storage devices 123. Opening the switch disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other deformable electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot linkage members of the deformable link assembly 101 relative to other linkage members of the deformable link assembly 101. This method of deforming the deformable link assembly 101 allows the user to simply and quickly bend the deformable electronic device 100 into a desired geometric configuration. Examples of common geometric configurations include an L geometric configuration, a tent geometric configuration, which becomes a tent-folded, surface supported geometric configuration when situated on a surface with the base of the tent geometric configuration abutting the table, a hook geometric configuration, and a wrapped geometric configuration. Others will be obvious to those of ordinary skill in the art having the benefit of this disclosure.

In other embodiments, rather than relying upon the manual application of force, the deformable electronic device 100 can include a mechanical actuator to deform the deformable link assembly 101 around the pivot members 103 of each linkage member. For example, a motor or other mechanical actuator can be operable with structural components to deform the deformable link assembly 101 around the pivot members 103 of the linkage members to predetermined angles or geometric alignments in one or more embodiments. The inclusion of a mechanical actuator allows a precise bend angle to be repeatedly achieved without the user having to make adjustments in attempting to achieve the same. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1.

Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning now to FIGS. 2-7, illustrated therein are three illustrative results of bending operations.

Figures 2, 3, 4:
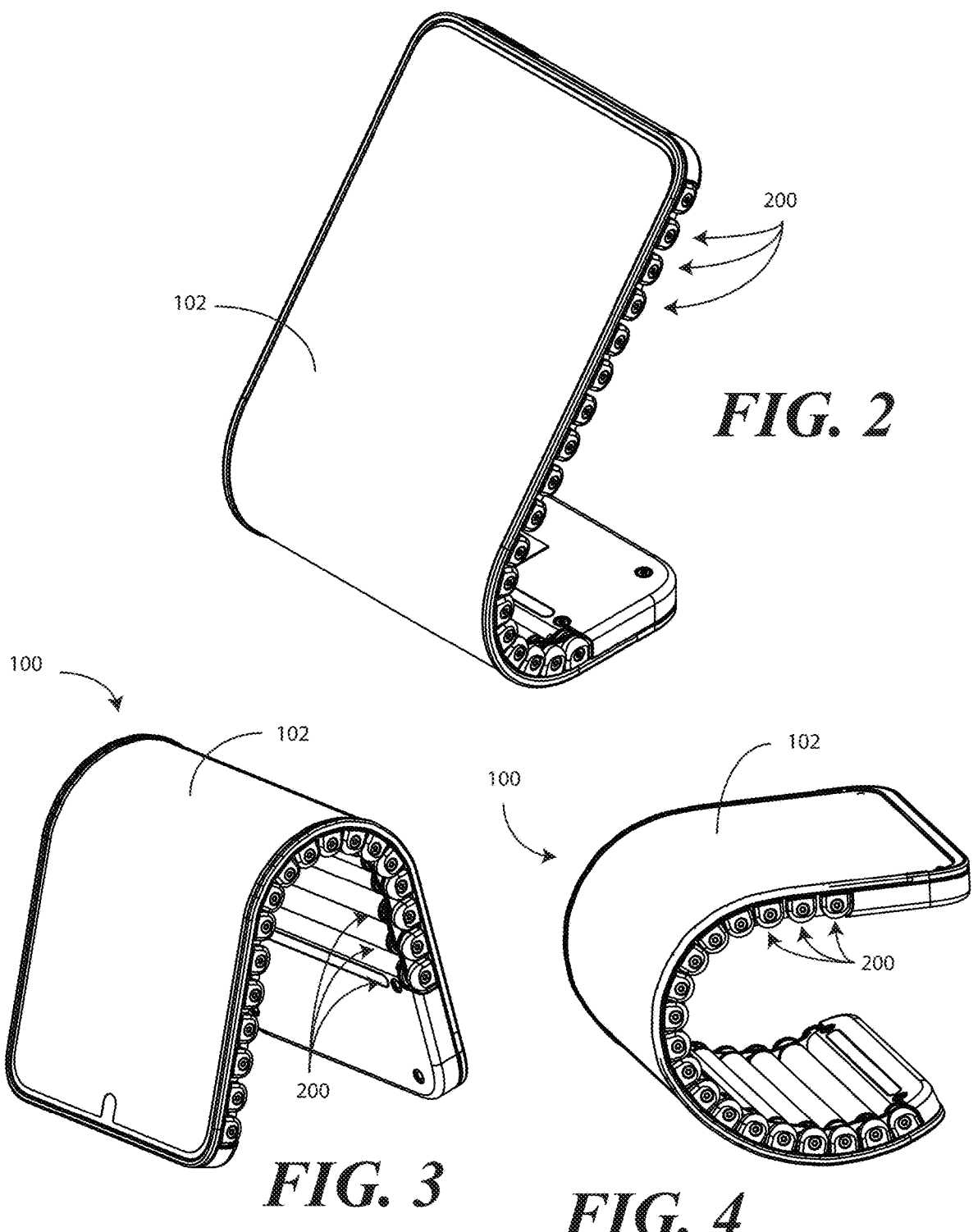
FIG. 2 illustrates one explanatory deformable electronic device in accordance with one or more embodiments of the disclosure when in a deformed to a "L stand" geometric configuration.
FIG. 3 illustrates one explanatory deformable electronic device in accordance with one or more embodiments of the disclosure when in a deformed to a "tent pad" geometric configuration.
FIG. 4 illustrates one explanatory deformable electronic device in accordance with one or more embodiments of the disclosure when in a deformed to a "wrap" geometric configuration.

In the illustrative embodiment of FIG. 2, the deformable electronic device 100 has been deformed into an L-shape geometric configuration. Additionally, the L-shape geometric configuration has been placed on a table or other flat surface such that the minor planar surface of display 102 defining the "L" abuts the surface. This is known as a "L stand" geometric configuration, with the deformable electronic device 100 having a single bend. This bent configuration can make the display 102 easier for the user to view since they do not have to hold the deformable electronic device 100 in their hands.

In this illustrative embodiment, the display 102 has a single bend about the linkage members 200. However, in other embodiments, the display 102 can be deformed with a plurality of bends about the linkage members 200. Other configurations will be obvious to those of ordinary skill in the art having the benefit of this disclosure.

In one embodiment, the one or more processors (112) of the deformable electronic device 100 are operable to detect that a bending operation is occurring from signals from the magnetometers of the magnet magnetometer pairs (120). Said differently, in one or more embodiments the one or more processors (112) are configured to determine whether the deformable electronic device 100 is deformed, and into what geometric configuration, from signals from the magnetometers of the magnet magnetometer pairs (120). This can be done in conjunction with other signals from the accelerometers (125).

Figures 5, 6, 7:
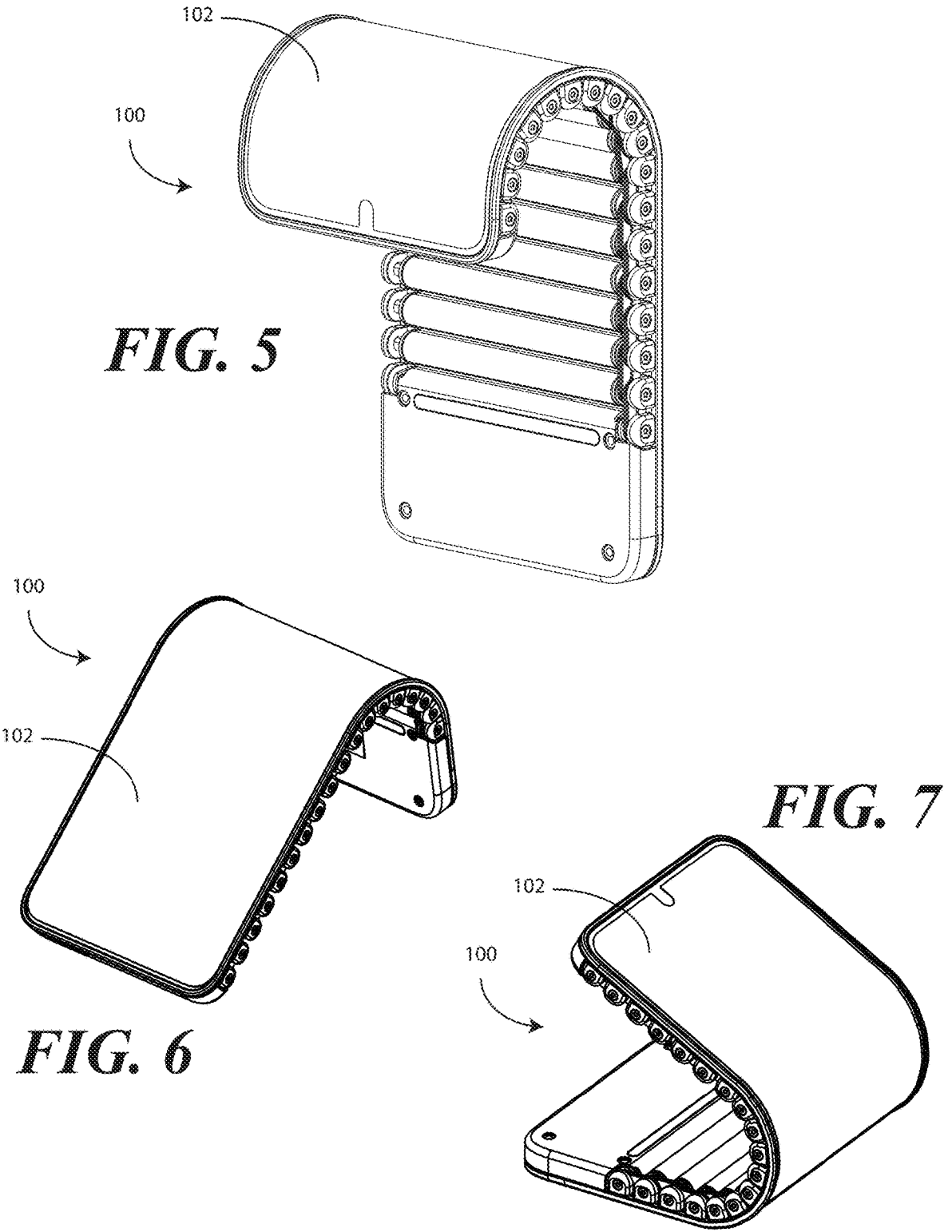
FIG. 5 illustrates one explanatory deformable electronic device in accordance with one or more embodiments of the disclosure when in a deformed to a "hook" geometric configuration.
FIG. 6 illustrates one explanatory deformable electronic device in accordance with one or more embodiments of the disclosure when in a deformed to a "L pad" geometric configuration.
FIG. 7 illustrates one explanatory deformable electronic device in accordance with one or more embodiments of the disclosure when in a deformed to a "tent lean back" geometric configuration.

Where, for instance, the deformable electronic device 100 comprises a first accelerometer situated to one side of the plurality of linkage members and a second accelerometer situated to a second side of the plurality of linkage members, the one or more processors (112) are configured to determine, when the deformable electronic device 100 is deformed as shown in FIG. 2, whether the deformable electronic device 100 is in a pad orientation (the deformable electronic device 100 is shown in a L pad geometric configuration in FIG. 6), a stand orientation, or, in the case of tent folds such as that shown in FIG. 3, whether the deformable electronic device 100 is in a tent pad orientation (shown in FIG. 3) or a tent lean back orientation (the deformable electronic device 100 is shown in a tent lean back geometric configuration in FIG. 7). Techniques for doing this are further described below with reference to FIG. 18.

In FIG. 2, the one or more processors (112) are operable to determine the deformable electronic device 100 is in a L stand configuration from signals from the magnet magnetometer pair (120) and other signals from the accelerometers (125). The one or more processors (112) can detect other geometric configurations of the deformable electronic device 100 as well, one example of which is the hook geometric configuration shown in FIG. 5.

In one or more embodiments, the one or more processors (112) can partition the display 102 of the deformable electronic device 100 as another function of the geometric alignment of the deformable link assembly (101) resulting from the bending operation. For example, in the illustrative embodiment of FIG. 2 the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well using the magnet magnetometer pairs (120) and/or accelerometers (125).

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end (108) and the second end (109) were resting on the surface, which is known as a "pad" orientation, and which is shown in FIG. 6, the deformable electronic device 100 would resemble an offset tent with a first portion of the display 102 visible from a first side of the bend and a second portion of the display 102 visible from a second side of the bend.

However, as noted above this "presentation on both sides of the tent fold," while highly effective when two people are viewing the first portion and the second portion, respectively, quickly drains the one or more energy storage devices (123). To prevent this, when only one person is using the electronic device 100, the one or more processors (112) execute a method that includes detecting, with one or more sensors (121), the deformable housing of the electronic device 100 being deformed into a tent geometric configuration with an apex defined by a tent fold of the tent geometric configuration being situated above a base defined by ends of the deformable housing. The method then receives, with an audio input device, an audible command requesting a presentation of content on the display 102 supported by the deformable housing.

In one or more embodiments, when this occurs the method includes capturing, with an image capture device situated to a first side of the tent fold, at least one image. The one or more processors (112) can then cause the presentation of the content to occur on a first portion of the display 102 situated to the first side of the tent fold when the at least one image depicts a face.

In one or more embodiments, the one or more processors (112) further cause the presentation of the content to occur on a second portion of the flexible display situated to a second side of the tent fold when the at least one image fails to depict any face. The one or more processors (112) can optionally omit any presentation of content on the first portion when the at least one image fails to depict the any face in one or more embodiments. Moreover, the one or more processors (112) can cause the presentation of the content to switch from the first portion to the second portion in response to another predefined audible command received by the audio input device.

When the bend is made in the middle, rather than in an offset location such as that shown in FIG. 2, the L geometric configuration transforms to a "tent" geometric configuration. One example of such a tent geometric configuration is shown in FIG. 3. As shown in FIG. 3, the deformable electronic device 100 has been bent further to resemble a playing card bent into a "tent" configuration. The tent configuration of FIG. 3 is in a "pad" orientation because the first end (108) and the second end (109) of the deformable electronic device 100 are resting on a surface. This "tent pad" geometric configuration makes the display 102 easier to see from above.

FIG. 4 illustrates the deformable electronic device 100 when deformed into a "wrapped" geometric configuration. When in the wrapped geometric configuration, the deformable electronic device 100 can even be worn on a wrist. When worn on a wrist, the wrapped geometric configuration becomes a wrist-worn wrapped geometric configuration. Whether the electronic device 100 is positioned on a wrist can be determined with touch sensors situated along the deformable housing.

In one or more embodiments, the wrapped geometric configuration can be configured with different radii to accommodate different size wrists. In one or more embodiments, the deformable electronic device 100 can be deformed into at least six different wrapped geometric configurations, each having a smaller radius than the one before to accommodate smaller and smaller wrists.

In one or more embodiments, the plurality of linkage members 200 define a multi-link hinging mechanism for the deformable electronic device 100. In FIGS. 1-7 the linkage members 200 are all similarly configured with links separating each pivot member (103) from another. The linkage members 200 defining the deformable link assembly 101 are attached to a rear major face of the flexible substrate supporting the display 102.

Figure 8:
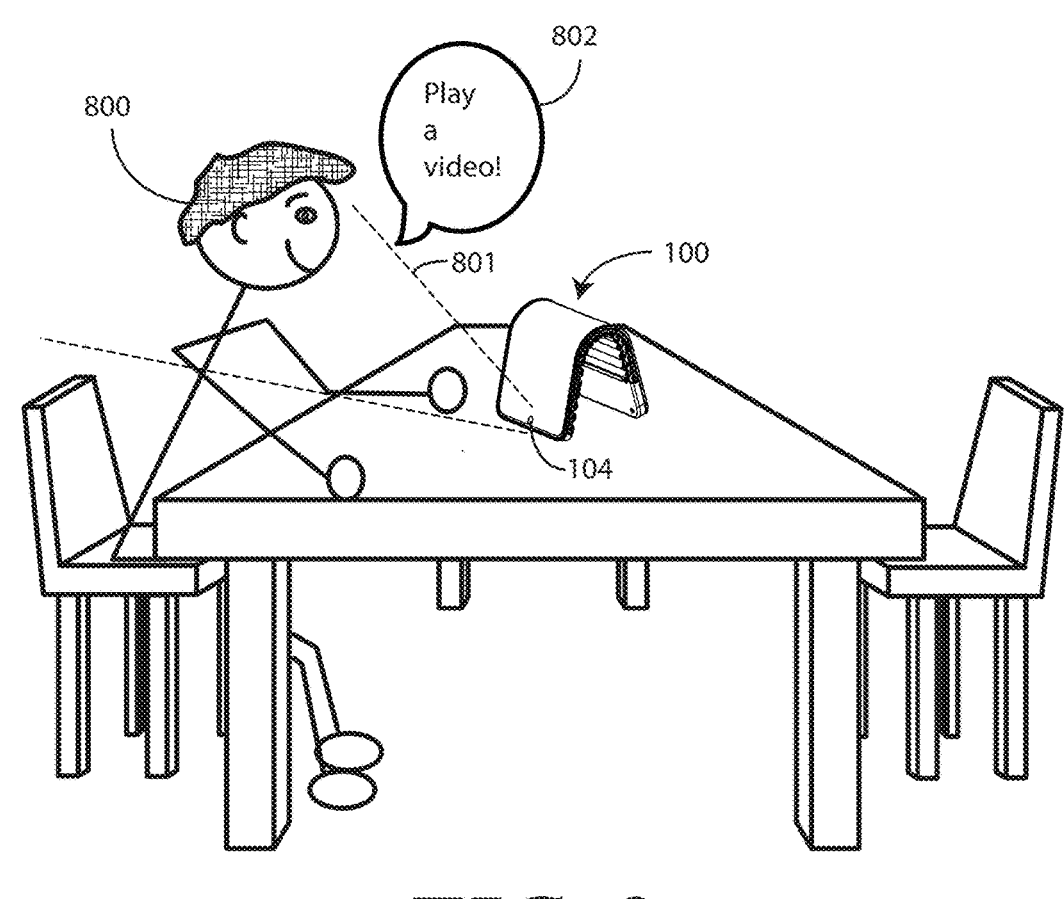
FIG. 8 illustrates a user using one explanatory deformable electronic device in accordance with one or more embodiments of the disclosure.

Turning now to FIG. 8, illustrated therein is a user 800 using an electronic device 100 configured in accordance with one or more embodiments of the disclosure while in a tent-folded, surface supported condition with the surface being the desk that the electronic device 100 is sitting upon. In one or more embodiments, the surface supporting the tent-folded, surface supported geometric configuration comprises one of a table or desk and the surface is oriented orthogonally relative to a direction of gravity.

The user 800 is depicted as issuing an audible control command 802, "Play a video!" which is directed towards the electronic device 100. As such, this audible control command 802 comprises a request for the presentation of content on the display 102. Since the electronic device 100 is configured in accordance with one or more embodiments of the disclosure, the audible control command 802 comprises a request for the presentation of content only on a portion of the display 102.

In one or more embodiments, the electronic device 100, in response to the audible control command 802, activates an image capture device 104 to capture at least one image 801. In one or more embodiments, the one or more processors (112) cause the image capture device 104 to capture the at least one image 801 each time the one or more other sensors receive a new audible control command. In one or more embodiments, the image capture device 104 is configured to only capture the one or more images 1109 in response to the receipt of the audible control command 802 by the one or more other sensors when the tent-fold geometric configuration is supported by a surface.

The tent-folded, surface supported condition of the electronic device 100 can be detected through various methods. One method involves the use of one or more sensors (121) embedded within the electronic device 100 that are capable of detecting the geometric configuration of the device. These sensors (121) may include accelerometers or gyroscopes that can determine the orientation of the electronic device 100 relative to the surface and the direction of gravity, indicating that the device is in a tent-folded position. Another method for detecting the tent-folded condition could involve the use of magnet magnetometer pairs (120) situated within the linkage members of the device, which can detect changes in magnetic fields as the device is deformed into the tent-fold configuration.

Each detection method offers own benefits. For instance, accelerometers and gyroscopes provide real-time orientation data that can be used to determine not only the tent-folded condition but also the angle of the fold, which may be relevant for optimizing the viewing angle of the display. Magnet magnetometer pairs (120) can offer precise detection of the device's configuration changes without being affected by external movement or orientation, providing a reliable indication that the device is in the desired tent-folded state.

Upon detecting the tent-folded, surface supported condition and receiving the audible control command 802, in one or more embodiments the image capture device 104 captures at least one image 801. This image 801 is then processed to determine whether the user 800 is positioned on the first side of the tent fold, which would be the side where the image capture device 104 is located, or on the second side. Depending on the user's position, the electronic device 100 will render visual content on the appropriate side of the flexible display 102 to ensure that the content is visible to the user 800 without the need for manual adjustment of the device. In this example, the at least one image 801 depicts the user 800 because the user 800 and image capture device 104 are situated on the same side of the tent-folded, surface supported geometric configuration.

Whether the content is presented on the left side or the right side of the tent-folded, surface supported geometric configuration depends, in one or more embodiments, upon whether the at least one image 801 matches at least one predefined criterion. Illustrating by example, in one or more embodiments the at least one predefined criterion comprises the at least one image 801 depicting a face, as would be the case in the situation shown in FIG. 8.

However, the at least one predefined criterion can take other forms as well. For instance, in other embodiments the at least one predefined criterion comprises the image 801 failing to depict a face. If, for example, the user 800 was situated on the right side of the electronic device 100, the at least one image 801 would fail to depict any face, causing the one or more processors (112) to present the content on the right side of the electronic device 100.

In still other embodiments, the at least one predefined criterion comprises the at least one image 801 depicting an authorized user of the electronic device looking at the first portion (here the left side) of the display 102. Since people can be situated distally from the electronic device 100, in one or more embodiments the at least one predefined criterion comprises the at least one image 801 depicting a face having a size exceeding a predefined image area threshold. In still other embodiments, the at least one predefined criterion comprises the at least one image 801 depicting one or more of a hand, finger, or inanimate object. Other predefined criterion will be obvious to those of ordinary skill in the art having the benefit of this disclosure.

Figure 9:
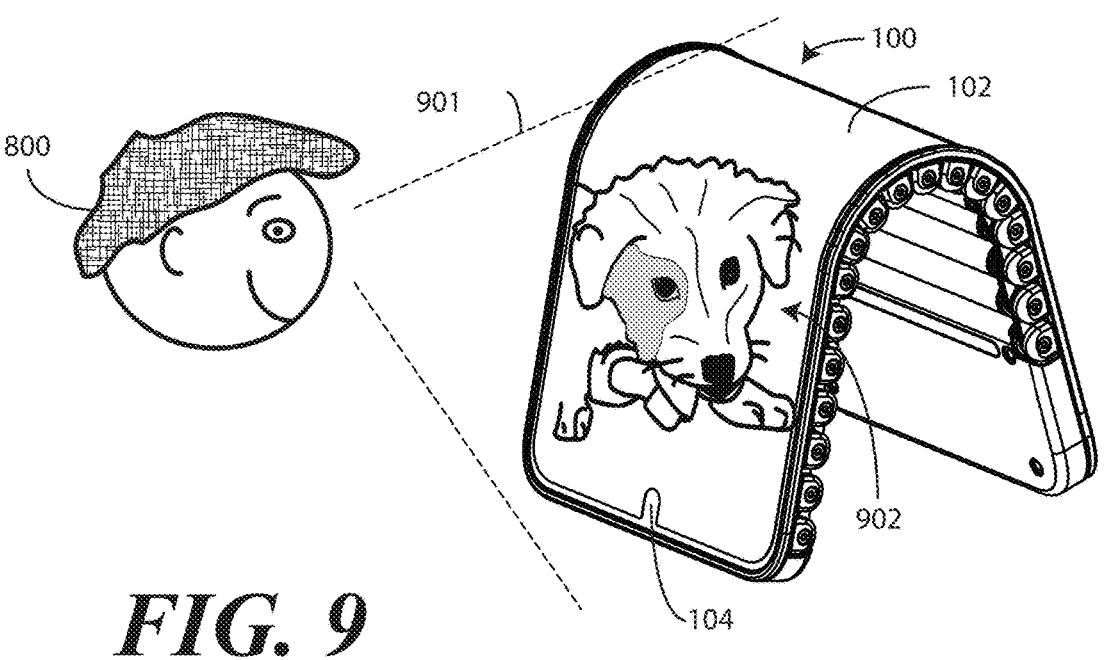
FIG. 9 illustrates a magnified view of the user using the explanatory electronic device in accordance with one or more embodiments of the disclosure.

Turning now to FIG. 9, since the user 800 is situated on the left side of the electronic device 100, the content 902 is presented on a first portion of the display 102, which is situated to the left side of the apex of the tent fold defining the deformed portion of the tent-folded, surface supported geometric configuration. This advantageously positions the content 902 within the gaze cone 901 of the user 800, where it can be easily seen. In this example, the image capture device 104 and the first portion of the display 102 presenting the content are on the same side of the tent-folded, surface supported geometric configuration.

In one or more embodiments, when the at least one image (801) indicates that the user 800 is situated on a side of the electronic device 100 opposite the image capture device 104, the one or more processors (112) further omit the presentation of any content on the second portion when the one or more images depict the person. In the illustrative example of FIG. 9, the one or more processors (112) might omit the presentation of content on the rear portion of the display 102, for example.

In one or more embodiments, when the at least one image (801) indicates that the user 800 is situated on a side of the electronic device 100 opposite the image capture device 104, the one or more processors (112) further deactivate the side of the display 102 not presenting the content 902. In the illustrative example of FIG. 9, the one or more processors (112) might deactivate the rear portion of the display 102, for example. Moreover, in one or more embodiments the one or more processors (112) cause the presentation of the content 902 only when the electronic device 100 is in an unlocked mode of operation when the audible control command (802) is received.

The ability of the electronic device 100 to dynamically render content on the active viewing portion of the flexible display 102 based on the user's presence and position, as determined by the image capture device 104, represents a significant innovation in adaptive display technology. This capability enhances the user experience by providing a hands-free, convenient viewing experience while also conserving battery life by only activating the portion of the display that is in use.

As shown in FIGS. 8-9, embodiments of the disclosure provide an innovative solution to the challenges posed by adaptive display devices in tent mode. Embodiments of the disclosure determine that the electronic device 100 is an adaptive display device configurable to transform into different form factors dynamically. Once the electronic device 100 is placed on a table or desk in tent mode, the electronic device—in one or more embodiments—enters a default mode known as "ergonomic view," where it is assumed that the user 800 does not intend to move the electronic device 100 while it remains on the table.

To activate the presentation of content 902 on the electronic device 100, in one or more embodiments the user 800 issues a voice command, which triggers the electronic device 100 to respond. In response to this voice command, in one or more embodiments the electronic device 100 utilizes its image capture device 104 to detect the presence of the user 800. The image capture device's detection helps determine the probable side of the display where the visuals should be rendered. In one or more embodiments, if the user 800 is found on the side where the image capture device 104 is located, the visuals are rendered on that side. If no user is detected, in one or more embodiments the visuals are rendered on the opposite side of the display 102.

This method of FIGS. 8-9 ensures that the content 902 is always visible to the user 800 without requiring manual rotation of the electronic device 100. The one or more processors (112) intelligently adjust the presentation area of the display 102 to render the content 902 on the side of the display 102 where the user 800 is looking, based on the voice command trigger. This dynamic adjustment not only enhances user convenience but also optimizes battery usage by activating only the necessary portion of the display, addressing the battery constraints associated with thin, flexible devices.

In essence, the solution leverages the device's image capture device 104 and voice interaction capabilities to intelligently determine the user's position and render content 902 accordingly. This approach ensures that the content 902 is always visible to the user 800 without the need for manual adjustments, thereby enhancing the overall user experience. The method also conserves battery life by activating only the necessary portion of the display 102, making it a practical and efficient solution for adaptive display devices in tent mode.

Figure 10:
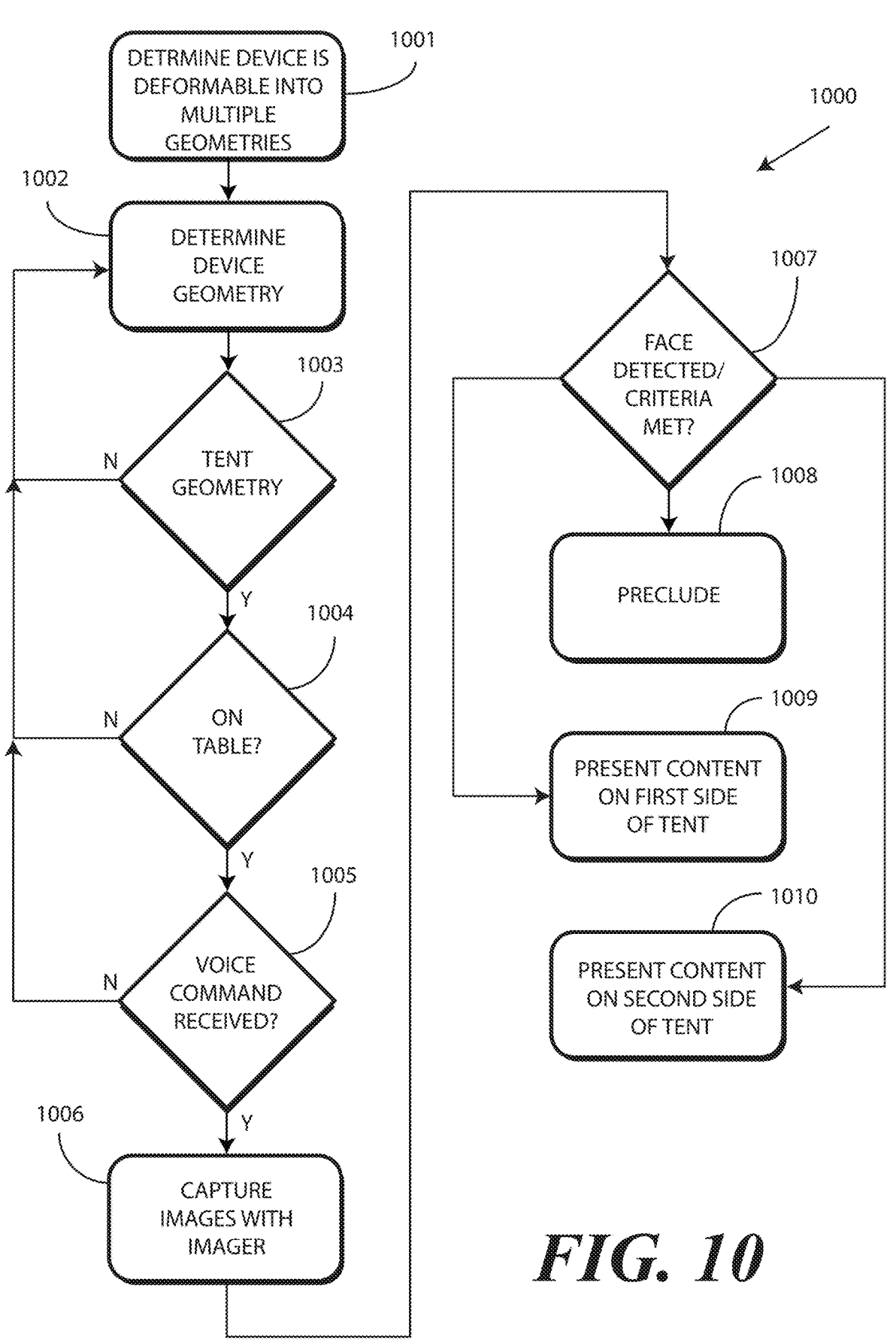
FIG. 10 illustrates one explanatory method in accordance with one or more embodiments of the disclosure.

Turning now to FIG. 10, illustrated therein is one explanatory method 1000 in accordance with one or more embodiments of the disclosure. Embodiments of the disclosure contemplate that when an electronic device is in a tent-folded, surface supported geometric configuration, the method 1000 can ensure that content is presented only to the side of the tent fold of the tent-folded, surface supported geometric configuration that is situated within the gaze cone of a user, thereby ensuring the content remains visible.

Beginning at step 1001, one or more processors of an electronic device determine that the electronic device is a deformable electronic device capable of being deformed into a variety of geometries. Step 1002 then uses one or more sensors of the electronic device to detect a geometric form factor of an electronic device having a deformable device housing.

Decision 1003 and decision 1004 then determine whether the geometric form factor is a tent-folded, surface supported geometric configuration. Illustrating by example, in one or more embodiments decision 1003 detects, with one or more sensors, whether a deformable housing of the electronic device is being deformed into a tent geometric configuration with an apex defined by a tent fold of the tent geometric configuration being situated above a base defined by ends of the deformable housing. Decision 1003 then determines whether the tent fold is supported by a surface, such as a desk or table. These decisions 1003,1004 can be performed in a variety of ways.

Illustrating by example, in one or more embodiments decision 1003 comprises determining whether the deformable electronic device is in a tent-folded geometric configuration. This decision ensures that the device is correctly positioned to render visual content based on the user's location. The tent-folded configuration is characterized by an apex defined by a tent fold, with decision 1004 thereafter determining whether the base of the device supported by a surface such as a table or desk.

There are several ways to make this determination of a tent fold geometric configuration at decision 1003, each with its own set of benefits. One method involves using accelerometers and gyroscopes embedded within the device. These sensors can detect changes in orientation and movement, providing real-time data on the device's position. The accelerometers measure linear acceleration, while the gyroscopes measure rotational movement. By analyzing the data from these sensors, the device can accurately determine whether it is in a tent-folded configuration. The benefit of this method is its ability to provide continuous, real-time monitoring of the device's orientation, ensuring that the content is always displayed correctly.

Another method involves using magnetometer pairs situated within the linkage members of the device. These sensors detect changes in magnetic fields as the device is deformed into the tent-fold configuration. The magnetometers can sense the relative positions of the linkage members, allowing the device to determine its geometric configuration. The benefit of using magnetometer pairs is their precision in detecting the exact configuration of the device, which is particularly useful for devices with complex, multi-link hinge mechanisms.

Additionally, the device could employ optical sensors to determine its configuration. These sensors can capture images of the device's surroundings and analyze them to detect the tent-folded state. For example, the optical sensors could identify the surface on which the device is placed and the angle of the tent fold. The benefit of using optical sensors is their ability to provide detailed, visual information about the device's environment, which can be used to enhance the accuracy of the configuration detection.

Each of these methods offers unique advantages. Accelerometers and gyroscopes provide real-time, continuous monitoring, ensuring that the device's orientation is always accurately tracked. Magnetometer pairs offer precise detection of the device's configuration, making them ideal for devices with complex hinge mechanisms. Optical sensors provide detailed visual information about the device's environment, enhancing the accuracy of the configuration detection. By employing one or more of these methods, the device can reliably determine whether it is in a tent-folded geometric configuration, ensuring that the content is always displayed correctly and enhancing the overall user experience.

Decision 1004 of FIG. 10 determines whether the deformable electronic device is supported by a surface while in the tent-folded geometric configuration. This decision 1004 ensures that the device is correctly positioned to render visual content based on the user's location and the device's stability. The tent-folded configuration is characterized by an apex defined by a tent fold, with the base of the device supported by a surface such as a table or desk.

There are several ways to make this determination, each with its own set of benefits. One method involves using pressure sensors embedded within the base of the device. These sensors can detect the presence of a surface by measuring the pressure exerted on the base of the device. When the device is placed on a surface, the pressure sensors register a change in pressure, indicating that the device is supported. The benefit of this method is its simplicity and direct measurement of surface support, ensuring accurate detection.

Another method involves using accelerometers and gyroscopes to detect the orientation and stability of the device. These sensors can measure the device's position relative to gravity and detect any movement or instability. When the device is placed on a stable surface, the accelerometers and gyroscopes register a consistent orientation and minimal movement, indicating that the device is supported. The benefit of using accelerometers and gyroscopes is their ability to provide continuous, real-time monitoring of the device's stability, ensuring that the content is always displayed correctly.

Additionally, the device could employ optical sensors to determine its support by a surface. These sensors can capture images of the device's surroundings and analyze them to detect the presence of a surface. For example, the optical sensors could identify the surface on which the device is placed and the angle of the tent fold. The benefit of using optical sensors is their ability to provide detailed, visual information about the device's environment, which can be used to enhance the accuracy of the surface support detection.

Each of these methods offers unique advantages. Pressure sensors provide a direct measurement of surface support, ensuring accurate detection. Accelerometers and gyroscopes provide real-time, continuous monitoring of the device's stability, ensuring that the device's orientation is always accurately tracked. Optical sensors provide detailed visual information about the device's environment, enhancing the accuracy of the surface support detection. By employing one or more of these methods, the device can reliably determine whether it is supported by a surface while in the tent-folded geometric configuration, ensuring that the content is always displayed correctly and enhancing the overall user experience.

Where the electronic device is determined to be in a tent-folded, surface supported geometric configuration, decision 1005 determines whether an audible command requesting a presentation of content on a flexible display supported by the deformable housing is received. Where it is, the method 1000 proceeds to step 1006. Otherwise, the method 1000 returns to step 1002.

Figure 12:
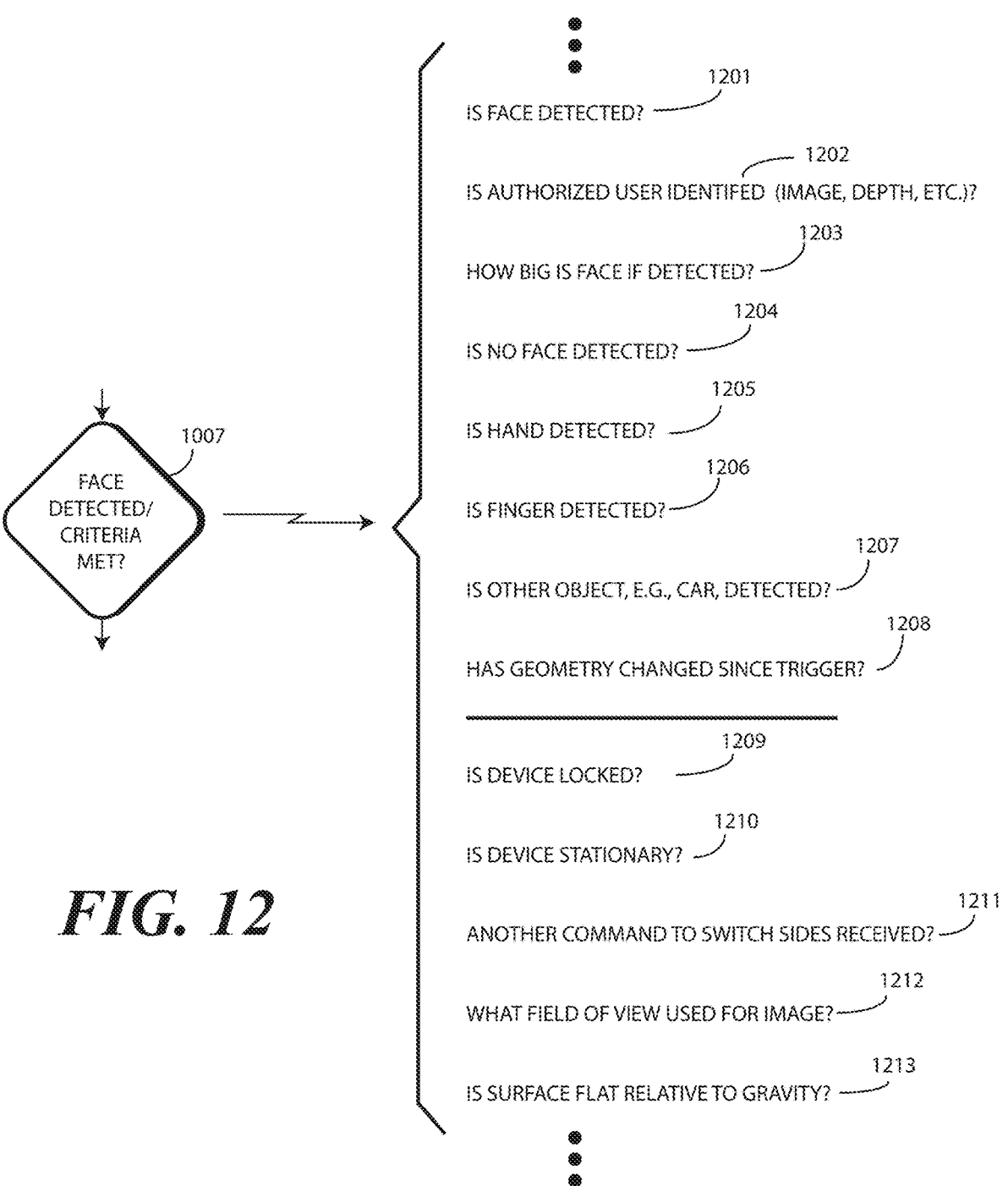
FIG. 12 illustrates one or more explanatory method steps in accordance with one or more embodiments of the disclosure.

At step 1006, the method 1000 captures, with an image capture device situated to a first side of the tent fold, at least one image. Decision 1007 then determines whether the at least one image captured at step 1006 matches one or more predefined criteria, which can take a variety of forms. Turning briefly to FIG. 12, illustrated therein are a few examples of how decision 1007 can be made. Others will be obvious to those of ordinary skill in the art having the benefit of this disclosure.

In one or more embodiments, the method (1000) of FIG. 10 causes a presentation of content to occur on the first portion of the flexible display when the at least one image matches a first predefined criterion and causes the presentation of the content to occur on the second portion of the flexible display when the at least one image matches a second predefined criterion. It should be noted that the criteria set forth in FIG. 12 can be used for the first predefined criterion or the second predefined criterion. Moreover, the example criteria shown in FIG. 12 are illustrative only and are not intended to form an inclusive list. Numerous other criteria suitable for determination at decision 1007 will be obvious to those of ordinary skill in the art having the benefit of this disclosure.

In one or more embodiments, the predefined criterion 1201 comprises whether a face is depicted in the at least one image. In one or more embodiments, when a face is depicted in the at least one image, the one or more processors of the electronic device cause the presentation of the content to occur on a first portion of the flexible display situated to a first side of the tent fold. By contrast, when the predefined criterion 1204 indicates there is no face depicted in the at least one image, in one or more embodiments the one or more processors of the electronic device cause the presentation of the content to occur on a second portion of the flexible display situated to a second side of the tent fold. In one or more embodiments, the image capture device of the electronic device is situated on the first portion of the flexible display when this occurs.

In another embodiment, the predefined criterion 1202 comprises whether the at least one image depicts an authorized user of the electronic device looking at the first portion of the flexible display situated to a first side of the tent fold. In one or more embodiments, when the at least one image depicts an authorized user looking at the first portion of the flexible display, the one or more processors present content on the first portion of the flexible display. By contrast, when the at least one image fails to depict the authorized user looking at the first portion of the flexible display, the one or more processors can cause the content to be presented on a second portion of the flexible display situated to a second side of the tent fold.

In another embodiment, the predefined criterion 1203 comprises the at least one image depicting a face having a size exceeding a predefined image area threshold. Embodiments of the disclosure contemplate that when the at least one image depicts a face, the size of the face can be important. Faces far away are likely not users using the electronic device. By contrast, faces filling the frame of the at least one image are likely users using the electronic device. Thus, in one or more embodiments the predefined criterion 1203 comprises the depicted face exceeding a predefined image area threshold.

This predefined image area threshold will vary as a function of field of view of the image capture device, but in one or more embodiments the predefined image area threshold is at least twenty-five percent of the image. Thus, in one or more embodiments, when the at least one image depicts a face having a size exceeding a predefined image area threshold, the one or more processors cause the presentation of the content on the first portion of the flexible display situated to a first side of the tent fold, which in one or more embodiments is positioned on the same side of the tent fold as the image capture device. By contrast, when the at least one image fails to depict a face having a size exceeding the predefined image area threshold, in one or more embodiments the one or more processors of the electronic device cause the presentation of the content to occur on the second portion of the flexible display situated to the second side of the tent fold.

In still another embodiment, the predefined criterion comprises whether the at least one image fails to depict a face, optionally within a predefined distance from the electronic device. In one or more embodiments, when a face is depicted in the at least one image, the one or more processors of the electronic device cause the presentation of the content to occur on first portion of the flexible display situated to a first side of the tent fold. By contrast, when the predefined criterion 1204 indicate there is no face depicted in the at least one image, in one or more embodiments the one or more processors of the electronic device cause the presentation of the content to occur on the first display situated to a second side of the tent fold.

In one or more embodiments, the predefined criterion 1205 comprises whether a hand is depicted in the at least one image. In one or more embodiments, when a hand is depicted in the at least one image, this is indicative of the imager being covered—or partially covered—by a user who is grasping the base of the tent-folded, surface supported geometric configuration while looking at the second portion of the flexible display situated to the second side of the tent fold. Accordingly, the one or more processors of the electronic device 100 cause the presentation of the content to occur on the second position of the flexible display situated to the second side of the tent fold. By contrast, when there is no hand depicted in the at least one image, in one or more embodiments the one or more processors of the electronic device cause the presentation of the content to occur on the first position of the flexible display situated to a first side of the tent fold.

In one or more embodiments, the predefined criterion 1206 comprises whether a finger is depicted in the at least one image. In one or more embodiments, when a finger is depicted in the at least one image, this is indicative of the imager being covered—or partially covered—by a user who is holding the base of the tent-folded, surface supported geometric configuration while looking at the second position of the flexible display situated to the other side of the tent fold. Accordingly, the one or more processors of the electronic device cause the presentation of the content to occur on the second position of the flexible display situated to the second side of the tent fold. By contrast, when there is no finger depicted in the at least one image, in one or more embodiments the one or more processors of the electronic device cause the presentation of the content to occur on the first position of the flexible display situated to a first side of the tent fold with the image capture device.

In one or more embodiments, the predefined criterion 1207 comprises whether an inanimate object, such as a car, boat, streetlight, house, or other inanimate object, is depicted in the at least one image. In one or more embodiments, when an inanimate object is depicted in the at least one image, this is indicative of the imager being oriented away from a user. Accordingly, the one or more processors of the electronic device cause the presentation of the content to occur on the second position of the flexible display situated to a second side of the tent fold. By contrast, when there is no inanimate object depicted in the at least one image, in one or more embodiments the one or more processors of the electronic device cause the presentation of the content to occur on the first portion of the flexible display situated to a first side of the tent fold.

In one or more embodiments, the image capture device captures the at least one image in response to the audible control command only when the geometric configuration is the tent-folded, surface supported geometric configuration. Accordingly, in one or more embodiments the predefined criterion 1208 can consider whether the geometric configuration has transitioned out of the tent-folded, surface supported geometric configuration, omitting the image capture when this is the case.

Turning now back to FIG. 10, in addition to determining whether the at least one image matches one or more criteria, decision 1007 can also determine whether one or more conditions are met when the at least one image is captured. In one or more embodiments, when decision 1007 determines that a first condition is met, the one or more processors can present the content on either the first portion of the flexible display situated to a first side of the tent fold or a second portion of the flexible display situated to a second side of the tent fold depending upon whether the at least one image matches a first predefined criterion or a second predefined criterion. However, where decision 1007 determines that the first condition is not met, or alternatively that a second condition is met, the one or more processors of the electronic device can preclude the presentation of the content at step 1008, even when the at least one image meets a predefined criterion.

Just as with the predefined criterion for the at least one image, the conditions determined at decision 1007 can vary. Turning briefly now back to FIG. 12, in one or more embodiments a first condition 1209 comprises determining whether the electronic device is in a locked state. In one or more embodiments, the content is only presented to one side of the tent fold when the electronic device is in an unlocked state.

In another embodiment, the condition 1210 comprises whether the electronic device is stationary when the at least one image is captured and/or when the audible control command is received. Said differently, in one or more embodiments the condition 1210 comprises the electronic device being stationary when the at least one image is captured.

In another embodiment, the condition 1211 comprises determining whether a command from a user to switch the content from a first portion of the flexible display to a second portion of the flexible display, or vice versa, has been received. In the rare instance where the automatic presentation of content on a portion of the flexible display occurs on the wrong side, a user may request that the content presentation be switched to the other side. Accordingly, when such a command is received the one or more processors may present the content on a portion of the flexible display other than the one originally selected.

In another embodiment, the condition 1212 comprises a predefined field of view of the imager. Embodiments of the disclosure contemplate that when, for example, an electronic device comprises multiple imagers on a major surface, when capturing the at least one image the imager with the widest field of view should be used. Accordingly, in one or more embodiments when the imager with the widest field of view is used to capture the at least one image, the analysis of decision 1007 can be performed. By contrast, if an imager with narrower field of view is used to capture the at least one image, the one or more processors may preclude the analysis of decision 1007.

In still another embodiment, the condition 1213 may comprise whether the surface supporting the tent-folded, surface supported geometric configuration is level relative to a direction of gravity. Said differently, the condition 1213 may be when a direction of gravity is substantially normal relative to the surface supporting the tent fold. Embodiments of the disclosure contemplate that a severely tilted surface may indicate a unique situation that changes the ordinary analysis of decision 1007. If a first portion of the flexible display is facing downward and the second portion of the flexible display is facing upward while the surface supporting the tent fold is tilted, this may indicate that the surface is being supported by a user's lap or body. Accordingly, one portion of the flexible display, such as the top, may be prioritized during the analysis of decision 1007.

Other conditions will be obvious to those of ordinary skill in the art having the benefit of this disclosure. Illustrating by example, another condition can comprise a dynamic event occurring at one of the display portions. Embodiments of the disclosure contemplate that when content is being presented on a display portion situated to one side of a tent fold when the predefined event occurs, and a user is interacting with the content, it would not be beneficial to cause the presentation of the content to switch to the other side of the tent fold. Accordingly, in one or more embodiments when a user is interacting with content being presented on a display portion situated to one side of the tent fold of a tent-folded, surface supported geometric configuration, the one or more processors preclude the presentation of the content being swapped from one side of the tent fold to the other side of the tent fold, even when the at least one image meets a predefined criterion.

Turning now back to FIG. 10, if the at least one image matches at a first predefined criterion, which could be any of those described above with reference to FIG. 12 or another criterion, as determined at decision 1007, the one or more processors cause a presentation of content on the first display portion situated to a first side of a tent fold of a tent-folded, surface supported geometric configuration at step 1009. By contrast, when the at least one image matches a second predefined criterion, which could be another of the criteria in FIG. 12 or another criterion, the one or more processors cause the presentation of the content to occur on the second display portion situated to a second side of the tent fold of the tent-folded, surface supported geometric configuration at step 1010.

In one or more embodiments, the method 1000 can repeat. Said differently, in one or more embodiments the one or more processors cause, at step 1006, the image capture device to capture the at least one image each time an audible control command is received, as determined by decision 1005. Thus, if the user moves or another user comes to use the electronic device while in the tent-folded, surface supported geometric configuration, the method 1000 can repeat to ensure that the content is presented on the proper side of the tent fold defined by the tent-folded, surface supported geometric configuration.

What happens to the display portion not presenting the content, e.g., the second display from FIG. 9, can vary. In one or more embodiments, the non-presenting display portion situated on the other side of the tent fold can change to another mode of operation. For example, in one embodiment, the one or more processors of the electronic device can simply deactivate the non-presenting display to conserve battery power. Thus, in one or more embodiments the one or more processors would deactivate the first display portion when the at least one image matches the second predefined criterion.

In another embodiment, the one or more processors of the electronic device can cause the non-presenting display portion of the flexible display to transition to a wallpaper mode of operation where it presents an image, pattern, or other static content. In still other embodiments, the one or more processors of the electronic device can suppress the sensitivity of the touch sensors associated with the non-presenting display portion. Illustrating by example, when the second display portion situated to the second side of the tent fold is presenting the content, the touch sensors of the first display portion can be largely suppressed such that touch events occurring at the first display portion situated opposite the tent fold from the second display portion are now largely suppressed or ignored. These operating modes are illustrative only, as numerous other examples of operating modes for the display at which the presentation of content has ceased will be obvious to those of ordinary skill in the art having the benefit of this disclosure.

Figure 11:
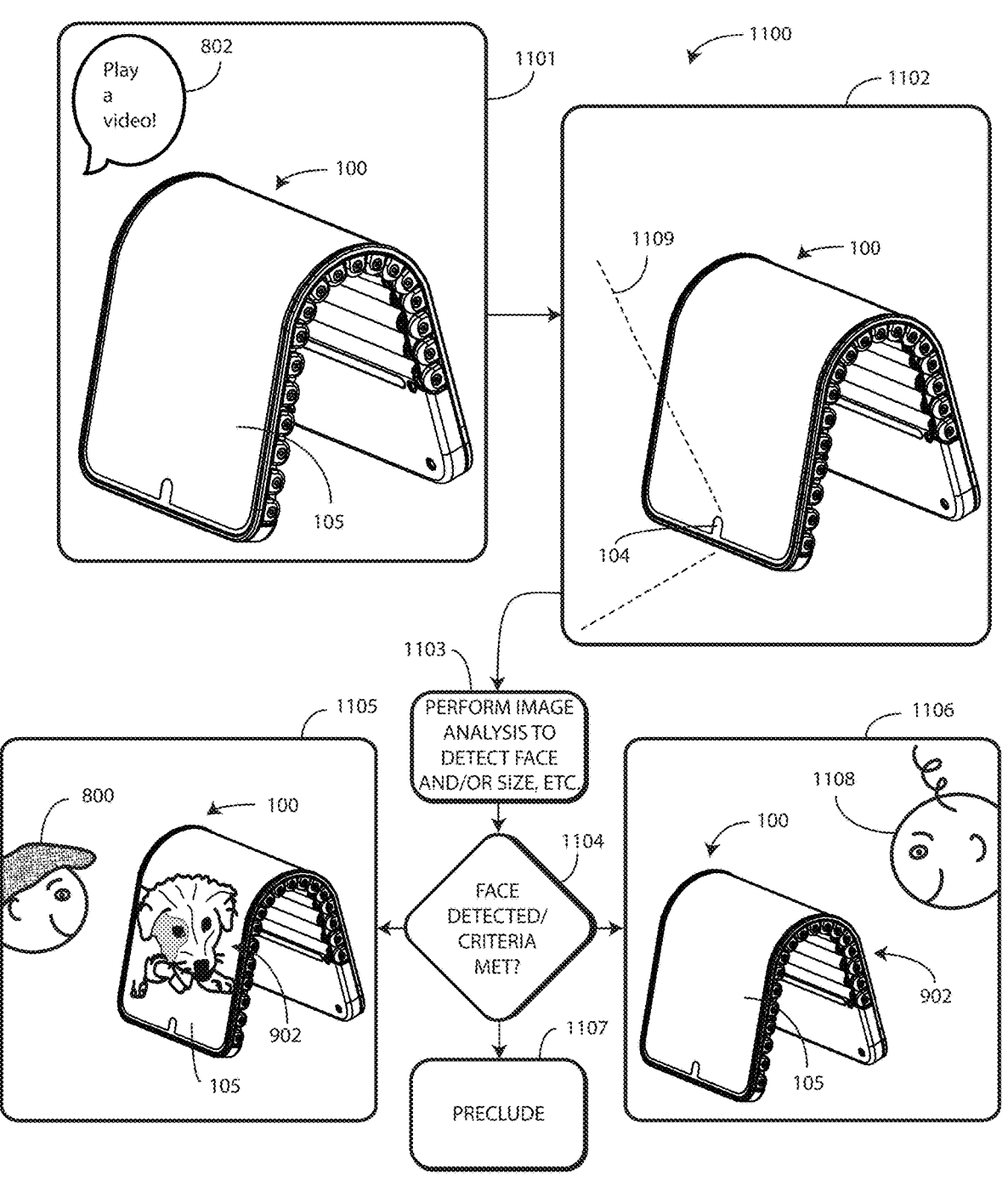
FIG. 11 illustrates another explanatory method in accordance with one or more embodiments of the disclosure.

Turning now to FIG. 11, illustrated therein is a use case 1100 illustrating the method (1000) of FIG. 10 in operation. Beginning at step 1101, an electronic device 100 is shown comprising a deformable housing comprising a plurality of linkage members, with a flexible display 105 supported by the deformable housing. The electronic device 100 comprises one or more sensors to determine that the electronic device 100 is in the tent fold geometric configuration shown at step 1101 where an apex defined by the tent fold of the tent geometric configuration is situated above a base defined by ends of the deformable housing. The electronic device 100 also includes an audio input device operable to receive an audible command in the form of an audible control command 802 requesting the presentation of content 902 on the flexible display 105 supported by the deformable housing.

At step 1102, in response to receipt of the audible command, an image capture device 104 captures one or more images 1109. At step 1103, one or more processors operable with the one or more sensors and the audio input device perform an image analysis process on the one or more images 1109 so that decision 1104 can determine whether the one or more images 1109 match a credefined criterion. As described above, in one or more embodiments when the one or more images 1109 match a first predefined criterion, the one or more processors can present content 902 on a first portion of the flexible display 105 situated to a first side of the tent fold. An example of this is shown at step 1105.

By contrast, when the one or more images 1109 match a second predefined criterion, in one or more embodiments the one or more processors cause the presentation of content 902 to occur on a second portion of the flexible display 105 situated to a second side of the tent fold as shown at step 1106. Accordingly, step 1105 makes the content visible to a user 800 situated to the left side of the tent fold. This would occur, for example, where the one or more images 1109 depict the face of the user 800, which occurs when the user and the image capture device 104 are situated on the same side of the electronic device 100.

However, when another user 1108 is situated to the right side of the electronic device 100, i.e., on an opposite side of the tent fold, the one or more images 1109 would fail to detect a face. Accordingly, the content 902 is presented on the right side of the flexible display 105, thereby allowing the other user 1108 to see the same. What's more, as shown at step 1106 the one or more processors have omitted any presentation of content on the first portion of the flexible display 105 situated to the left side of the tent fold when the one or more images 1109 fail to depict any face. Since the method (1000) depicted in the use case 1100 can repeat, the one or more processors can cause the presentation to switch from the left side of the tent fold to the right side of the tent fold, and vice versa, in response to another predefined audible command being received by the audio input device.

Thus, as shown in FIG. 11, one or more processors of the electronic device 100 operable with the one or more sensors cause a content presentation on a first portion of the flexible display 105 situated on a first side of the tent-fold geometric configuration when the one or more images 1109 depict a person and to cause the content presentation on a second portion of the flexible display 105 situated to a second side of the tent-fold geometric configuration when the one or more images fail to depict any person. Other criteria described above with reference to FIG. 12 can be used to determine whether the determination made at decision 1104 results in the use case 1100 moving to step 1105, step 1106, or step 1107.

Figure 13:
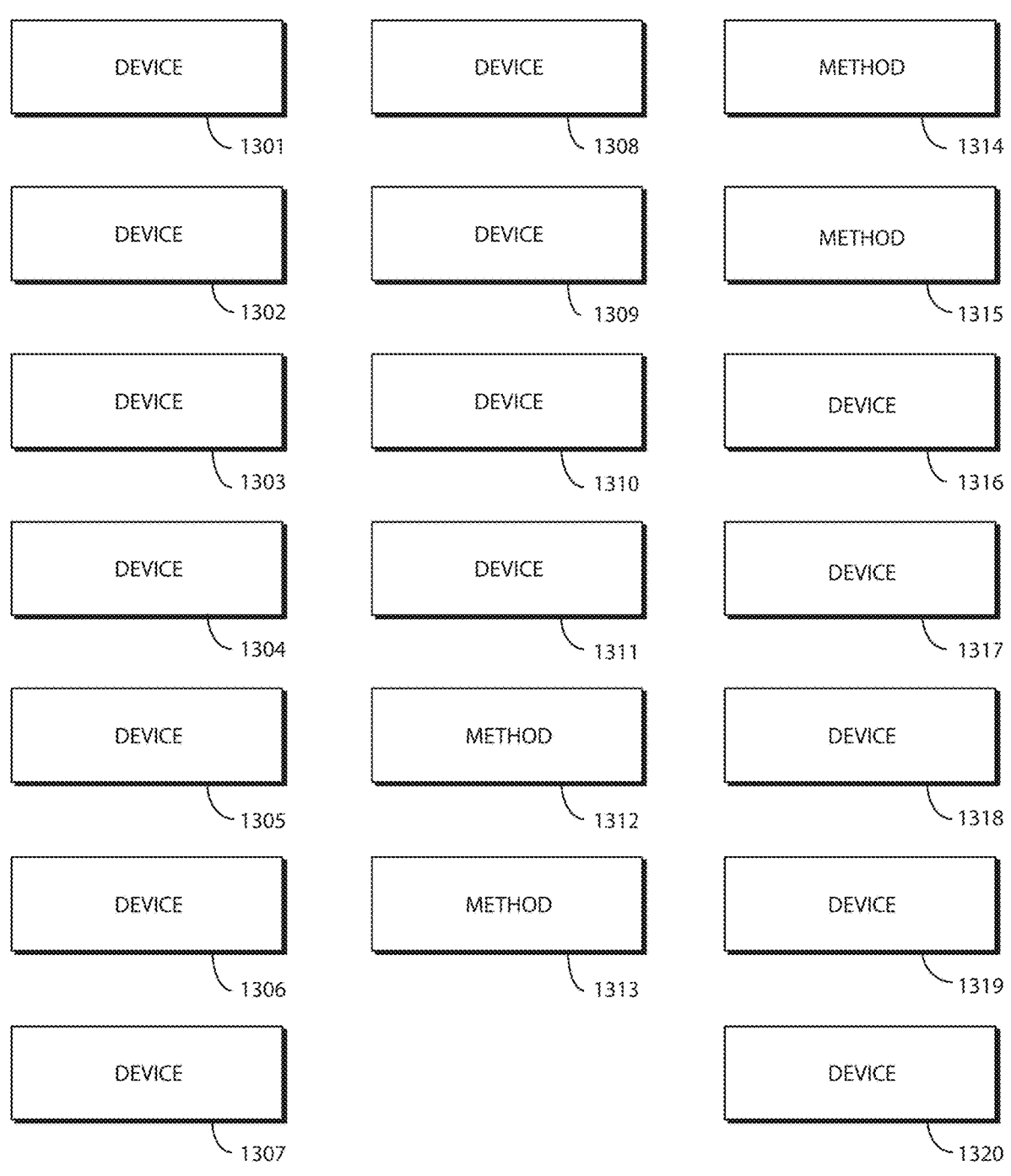
FIG. 13 illustrates various embodiments of the disclosure.

Turning now to FIG. 13, illustrated therein are various embodiments of the disclosure. The embodiments of FIG. 13 are shown as labeled boxes in FIG. 13 due to the fact that the individual components of these embodiments have been illustrated in detail in FIGS. 1-12, which precede FIG. 13. Accordingly, since these items have previously been illustrated and described, their repeated illustration is no longer essential for a proper understanding of these embodiments. Thus, the embodiments are shown as labeled boxes.

At 1301, an electronic device comprises a deformable housing supporting a flexible display and an image capture device. At 1301, the electronic device comprises one or more sensors operable to determine a tent-folded, surface supported geometric configuration of the electronic device delineating the flexible display into a first portion situated to a first side of a tent fold defined by the tent-folded, surface supported geometric configuration, a second portion situated to a second side of the tent fold, and a deformed portion occurring at the tent fold.

At 1301, the electronic device comprises one or more other sensors operable to receive an audible control command and one or more processors. At 1301, the one or more processors cause, in response to the audible control command, the image capture device to capture at least one image.

At 1301, when the at least one image matches a first predefined criterion, the one or more processors cause a presentation of content to occur on the first portion of the flexible display. At 1301, when the at least one image matches a second predefined criterion, the one or more processors cause the presentation of the content to occur on the second portion of the flexible display.

At 1302, the image capture device of 1301 and the first portion of the flexible display are both situated to the first side of the tent fold defined by the tent-folded, surface supported geometric configuration. At 1303, the first predefined criterion of 1302 comprises the at least one image depicting a face. At 1304, the second predefined criterion of 1303 comprises the at least one image failing to depict a face.

At 1305, the first predefined criterion of 1302 comprises the at least one image depicting an authorized user of the electronic device looking at the first portion of the flexible display. AT 1306, the first predefined criterion of 1302 comprises the at least one image depicting a face having a size exceeding a predefined image area threshold. At 1307, the second predefined criterion of 1302 comprises the at least one image depicting one or more of a hand, a finger, or an inanimate object.

At 1308, the audible control command of 1301 requests the presentation of the content on only a portion of the flexible display. At 1309, the one or more processors of 1301 cause the image capture device to capture the at least one image each time the one or more other sensors receive a new audible control command.

At 1310, when the at least one image of 1302 matches the second predefined criterion, the one or more processors deactivate the first portion of the flexible display. At 1310, when the at least one image matches the first predefined criterion, the one or more processors deactivate the second portion of the flexible display. At 1311, the one or more processors of 1302 cause the presentation of content only when the electronic device is in an unlocked mode of operation when the audible control command is received.

At 1312, a method in an electronic device comprises detecting, with one or more sensors, a deformable housing of the electronic device being deformed into a tent geometric configuration with an apex defined by a tent fold of the tent geometric configuration being situated above a base defined by ends of the deformable housing. At 1312, the method comprises receiving, with an audio input device, an audible command requesting a presentation of content on a flexible display supported by the deformable housing.

At 1312, the method comprises capturing, with an image capture device situated to a first side of the tent fold, at least one image. At 1312, the method comprises causing, by one or more processors, the presentation of the content to occur on a first portion of the flexible display situated to the first side of the tent fold when the at least one image depicts a face.

At 1313, the method of 1312 further comprises causing, by the one or more processors, the presentation of the content to occur on a second portion of the flexible display situated to a second side of the tent fold when the at least one image fails to depict any face. At 1314, the method of 1313 further comprises omitting, by the one or more processors, any presentation of content on the first portion when the at least one image fails to depict the any face. At 1315, the method of 1314 further comprises causing, by the one or more processors, the presentation of the content to switch from the first portion to the second portion in response to another predefined audible command received by the audio input device.

At 1316, an electronic device comprises a deformable housing comprises a plurality of linkage members, a flexible display supported by the deformable housing, and one or more sensors operable to determine a tent-fold geometric configuration of the electronic device. At 1316, the electronic device comprises one or more other sensors operable to receive an audible command requesting presentation of content on a portion of flexible display while in the tent-fold geometric configuration.

At 1316, the electronic device comprises an image capture device operable to capture one or more images in response to receipt of the audible command by the one or more other sensors. At 1316, the electronic device comprises one or more processors operable with the one or more sensors and the one or more other sensors. At 1316, the one or more processors are operable to cause a content presentation on a first portion of the flexible display situated on a first side of the tent-fold geometric configuration when the one or more images depict a person, and to cause the content presentation on a second portion of the flexible display situated to a second side of the tent-fold geometric configuration when the one or more images fail to depict any person.

At 1317, the image capture device of 1316 and the first portion of the flexible display are situated on a same side of the tent-fold geometric configuration. At 1318, the one or more processors of 1317 further omit the presentation of any content on the second portion when the one or more images depict the person.

At 1319, the image capture device of 1317 is configured to only capture the one or more images in response to the receipt of the audible command by the one or more other sensors when the tent-fold geometric configuration is supported by a surface. At 1320, the surface of 1319 comprises one of a table or desk and the surface is oriented orthogonally relative to a direction of gravity.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a deformable housing supporting a flexible display and an image capture device;
one or more sensors operable to determine a tent-folded, surface supported geometric configuration of the electronic device delineating the flexible display into:
   a first portion situated to a first side of a tent fold defined by the tent-folded, surface supported geometric configuration;
   a second portion situated to a second side of the tent fold; and
   a deformed portion occurring at the tent fold;
one or more other sensors operable to receive an audible control command; and
one or more processors;
the one or more processors causing, in response to the audible control command, the image capture device to capture at least one image;
wherein:
   when the at least one image matches a first predefined criterion, the one or more processors cause a presentation of content to occur on the first portion of the flexible display; and
   when the at least one image matches a second predefined criterion, the one or more processors cause the presentation of the content to occur on the second portion of the flexible display.

2. The electronic device of claim 1, wherein the image capture device and the first portion of the flexible display are both situated to the first side of the tent fold defined by the tent-folded, surface supported geometric configuration.

3. The electronic device of claim 2, wherein the first predefined criterion comprises the at least one image depicting a face.

4. The electronic device of claim 3, wherein the second predefined criterion comprises the at least one image failing to depict a face.

5. The electronic device of claim 2, wherein the first predefined criterion comprises the at least one image depicting an authorized user of the electronic device looking at the first portion of the flexible display.

6. The electronic device of claim 2, wherein the first predefined criterion comprises the at least one image depicting a face having a size exceeding a predefined image area threshold.

7. The electronic device of claim 2, wherein the second predefined criterion comprises the at least one image depicting one or more of a hand, a finger, or an inanimate object.

8. The electronic device of claim 1, wherein the audible control command requests the presentation of the content on only a portion of the flexible display.

9. The electronic device of claim 1, wherein the one or more processors cause the image capture device to capture the at least one image each time the one or more other sensors receive a new audible control command.

10. The electronic device of claim 2, wherein:
when the at least one image matches the second predefined criterion, the one or more processors deactivate the first portion of the flexible display; and
when the at least one image matches the first predefined criterion, the one or more processors deactivate the second portion of the flexible display.

11. The electronic device of claim 2, wherein the one or more processors cause the presentation of content only when the electronic device is in an unlocked mode of operation when the audible control command is received.

12. A method in an electronic device, the method comprising:
detecting, with one or more sensors, a deformable housing of the electronic device being deformed into a tent geometric configuration with an apex defined by a tent fold of the tent geometric configuration being situated above a base defined by ends of the deformable housing;
receiving, with an audio input device, an audible command requesting a presentation of content on a flexible display supported by the deformable housing;
capturing, with an image capture device situated to a first side of the tent fold, at least one image; and
causing, by one or more processors, the presentation of the content to occur on a first portion of the flexible display situated to the first side of the tent fold when the at least one image depicts a face.

13. The method of claim 12, further comprising causing, by the one or more processors, the presentation of the content to occur on a second portion of the flexible display situated to a second side of the tent fold when the at least one image fails to depict any face.

14. The method of claim 13, further comprising omitting, by the one or more processors, any presentation of content on the first portion when the at least one image fails to depict the any face.

15. The method of claim 14, further comprising causing, by the one or more processors, the presentation of the content to switch from the first portion to the second portion in response to another predefined audible command received by the audio input device.

16. An electronic device, comprising:
a deformable housing comprises a plurality of linkage members;
a flexible display supported by the deformable housing;
one or more sensors operable to determine a tent-fold geometric configuration of the electronic device;
one or more other sensors operable to receive an audible command requesting presentation of content on a portion of flexible display while in the tent-fold geometric configuration;
an image capture device operable to capture one or more images in response to receipt of the audible command by the one or more other sensors; and
one or more processors operable with the one or more sensors and the one or more other sensors, the one or more processors operable to cause a content presentation on a first portion of the flexible display situated on a first side of the tent-fold geometric configuration when the one or more images depict a person and to cause the content presentation on a second portion of the flexible display situated to a second side of the tent-fold geometric configuration when the one or more images fail to depict any person.

17. The electronic device of claim 16, wherein the image capture device and the first portion of the flexible display are situated on a same side of the tent-fold geometric configuration.

18. The electronic device of claim 17, the one or more processors further omitting the presentation of any content on the second portion when the one or more images depict the person.

19. The electronic device of claim 17, wherein the image capture device is configured to only capture the one or more images in response to the receipt of the audible command by the one or more other sensors when the tent-fold geometric configuration is supported by a surface.

20. The electronic device of claim 19, wherein the surface comprises one of a table or desk and the surface is oriented orthogonally relative to a direction of gravity.

* * * * *